US009807540B2

(12) United States Patent
Ray et al.

(10) Patent No.: US 9,807,540 B2
(45) Date of Patent: Oct. 31, 2017

(54) PEER-TO-PEER GROUP OWNER MULTI-CHANNEL CONCURRENT OPERATION AND ASSOCIATED ABSENCE PERIOD INDICATION FOR LEGACY CLIENT DEVICES

(71) Applicant: QUALCOMM Incorporated, San Diego, CA (US)

(72) Inventors: Sougat Ray, Odisha (IN); Sunit Pujari, Hyderabad (IN); Hemant Kumar Sahoo, Hyderabad (IN); Imran Ansari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 14/615,208

(22) Filed: Feb. 5, 2015

(65) Prior Publication Data

US 2016/0234626 A1 Aug. 11, 2016

(51) Int. Cl.
*G06F 15/177* (2006.01)
*H04W 4/00* (2009.01)
*H04L 29/08* (2006.01)

(52) U.S. Cl.
CPC ........... *H04W 4/005* (2013.01); *H04L 67/104* (2013.01); *H04L 67/1044* (2013.01)

(58) Field of Classification Search
USPC ......... 709/220, 200; 370/329, 229, 252, 311
See application file for complete search history.

(56) References Cited

U.S. PATENT DOCUMENTS 8,458,504 B2* 6/2013 Kangude ........... H04W 52/0225
370/311
8,542,620 B2* 9/2013 Sampathkumar . H04W 52/0216
370/311
(Continued)

FOREIGN PATENT DOCUMENTS

EP 2713670 A1 4/2014

OTHER PUBLICATIONS

Camps-Mur et al., "Device to Device Communications with WiFi Direct: Overview and Experimentation," IEEE Wireless Communications, vol. 20, Issue 3, Jun. 2013, 8 pgs., Institute of Electrical and Electronics Engineers.
(Continued)

*Primary Examiner* — Tammy Nguyen
(74) *Attorney, Agent, or Firm* — Holland & Hart LLP/Qualcomm

(57) ABSTRACT

Methods, systems, and devices are described for peer-to-peer (P2P) group owner (GO) multi-channel concurrent (MCC) operation and an associated absence period indication for legacy client devices. In some aspects, an absence period during which a peer-to-peer (P2P) group owner (GO) is unavailable to receive transmissions from client devices wirelessly coupled with the P2P GO may be identified. A notice of absence (NoA) may be transmitted by the P2P GO, the P2P NoA indicating the absence period if the client devices wirelessly coupled with the P2P GO include a P2P client device that supports a P2P protocol. A legacy wireless beacon may be transmitted by the P2P GO, the legacy wireless beacon comprising an information element (IE) indicating the absence period if the client devices wirelessly coupled with the P2P GO include a legacy client device that does not support the P2P protocol.

25 Claims, 13 Drawing Sheets

(56) References Cited

U.S. PATENT DOCUMENTS

| | | | | |
|---|---|---|---|---|
| 8,717,923 B2* | 5/2014 | Vedantham | ........... | H04L 1/1854 |
| | | | | 370/252 |
| 8,717,959 B2* | 5/2014 | Vedantham | ....... | H04W 52/0232 |
| | | | | 370/229 |
| 2005/0027779 A1* | 2/2005 | Schinner | .............. | G06Q 10/107 |
| | | | | 709/200 |
| 2013/0028156 A1 | 1/2013 | Vedantham et al. | | |
| 2013/0286973 A1* | 10/2013 | Selia | .................... | H04W 24/10 |
| | | | | 370/329 |
| 2014/0032951 A1* | 1/2014 | Garg | ................ | H04W 52/0219 |
| | | | | 713/323 |

OTHER PUBLICATIONS

ISA/EPO, International Search Report and Written Opinion of the International Searching Authority, Int'l App. No. PCT/US2016/012454, Apr. 13, 2016, European Patent Office, Rijswijk, NL, 11 pgs.

* cited by examiner

| Mute IE 405 ||||
|---|---|---|---|
| Header 410 | Duration 415 | Interval 420 | Start Time 425 |

FIG. 4

PEER-TO-PEER GROUP OWNER MULTI-CHANNEL CONCURRENT OPERATION AND ASSOCIATED ABSENCE PERIOD INDICATION FOR LEGACY CLIENT DEVICES

BACKGROUND

Field of the Disclosure

The present disclosure relates to wireless communication systems, and more particularly to peer-to-peer (P2P) group owner (GO) multi-channel concurrent (MCC) operation and an associated absence period indication for legacy client devices.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled with a network, such as the Internet, and enable a mobile device to communicate via the network and to communicate with other devices coupled with the AP.

WLAN Peer-to-Peer (P2P) technologies (such as Wi-Fi P2P, also known as Wi-Fi Direct) allow multiple devices to wirelessly communicate directly with one another via the WLAN without needing an AP. In a WLAN P2P network, one of the devices is selected as a P2P group owner (GO), and provides AP-like functionality to the other P2P devices that support the P2P protocol, which may be referred to as P2P client devices. The P2P GO may also act as a soft AP for legacy WLAN devices that do not support the P2P protocol.

In some circumstances, a P2P GO may have an operation to perform (e.g., scanning or changing channels, accessing a conventional AP as a STA itself, etc.) during which time the P2P GO will be unavailable to client devices (both P2P client devices and legacy WLAN client devices) wirelessly coupled with the P2P GO. To prevent the client devices from attempting to communicate with the P2P GO during these absence periods, the P2P GO can send a P2P Notice of Absence (NoA) to P2P client devices informing them of the absence period during which the P2P GO will be unavailable. Because legacy WLAN client devices do not support the P2P protocol, however, the P2P NoA may not be meaningful to legacy WLAN client devices. As such, the P2P GO may not be able to take an absence from the active mode to perform other operations when the P2P GO is acting as a soft AP for legacy client devices.

If, however, the P2P GO must perform other operations, the P2P GO may still advertise the P2P NoA—but the legacy WLAN client devices may not understand the P2P NoA and may thus attempt to transmit data to the P2P GO despite the P2P GO being unavailable. In this situation, the transmitted data packets may be lost, which may lead to reduced performance of the network and increased power consumption.

SUMMARY

The described features generally relate to improved systems, methods, apparatuses, or computer program products for peer-to-peer (P2P) group owner (GO) multi-channel concurrent (MCC) operation and an associated absence period indicator for legacy client devices. A P2P GO may identify an absence period during which the P2P GO will be unavailable to receive transmissions from one or more client devices wirelessly coupled with the P2P GO. The absence period may correspond to, for example, a period during which the P2P GO wireless communicates as a station (STA) with a conventional access point (AP) if the P2P GO is operating in an MCC mode of operation. Alternatively, the absence period may correspond to a channel scanning operation, or generally any period during which the P2P GO is unavailable to the client devices associated with the P2P GO.

The P2P GO may wirelessly transmit one or more indications of the absence period to the client devices wirelessly coupled with the P2P GO, with the number, type, and content of the indications transmitted by the P2P GO being based on the type(s) of client devices wirelessly coupled with the P2P GO. If the client devices wirelessly coupled with the P2P GO include one or more P2P client devices that support the WLAN P2P protocol, the P2P GO may transmit a P2P notice of absence (NoA) indicating the identified absence period according to the P2P protocol. If the client devices wirelessly coupled with the P2P GO include one or more legacy wirelessly client devices that do not support the P2P protocol, the P2P GO may transmit a legacy wireless beacon including an information element (IE) indicating the identified absence period. If both P2P client devices and legacy wireless client devices are wirelessly coupled with the P2P GO, the P2P GO may transmit both a P2P NoA and a legacy wireless beacon including the IE indicating the identified absence period.

A method for wireless communication is described. The method may include identifying an absence period during which a peer-to-peer (P2P) group owner (GO) is unavailable to receive transmissions from client devices wirelessly coupled with the P2P GO, transmitting by the P2P GO a P2P notice of absence (NoA) indicating the absence period if the client devices wirelessly coupled with the P2P GO include a P2P client device that supports a P2P protocol, and transmitting by the P2P GO a legacy wireless beacon including an information element (IE) indicating the absence period if the client devices wirelessly coupled with the P2P GO include a legacy client device that does not support the P2P protocol.

An apparatus for wireless communication is described. The apparatus may include a peer-to-peer (P2P) group owner (GO) controller to identify an absence period during which the P2P GO is unavailable to receive transmissions from client devices wirelessly coupled with the P2P GO, a P2P client device coordinator to transmit a P2P notice of absence (NoA) indicating the absence period if the client devices wirelessly coupled with the P2P GO include a P2P client device that supports a P2P protocol, and a legacy client device coordinator to transmit a legacy wireless beacon including an information element (IE) indicating the absence period if the client devices wirelessly coupled with the P2P GO include a legacy client device that does not support the P2P protocol.

A further apparatus for wireless communication is described. The further apparatus may include means for identifying an absence period during which a peer-to-peer (P2P) group owner (GO) is unavailable to receive transmissions from client devices wirelessly coupled with the P2P GO, means for transmitting by the P2P GO a P2P notice of absence (NoA) indicating the absence period if the client devices wirelessly coupled with the P2P GO include a P2P client device that supports a P2P protocol, and means for transmitting by the P2P GO a legacy wireless beacon including an information element (IE) indicating the absence period if the client devices wirelessly coupled with the P2P GO include a legacy client device that does not support the P2P protocol.

A non-transitory computer-readable medium for wireless communication in a wireless device is described. The non-transitory computer-readable medium may store computer-executable code for identifying an absence period during which a peer-to-peer (P2P) group owner (GO) is unavailable to receive transmissions from client devices wirelessly coupled with the P2P GO, transmitting by the P2P GO a P2P notice of absence (NoA) indicating the absence period if the client devices wirelessly coupled with the P2P GO include a P2P client device that supports a P2P protocol, and transmitting by the P2P GO a legacy wireless beacon including an information element (IE) indicating the absence period if the client devices wirelessly coupled with the P2P GO include a legacy client device that does not support the P2P protocol.

In the methods, apparatuses, and non-transitory computer-readable mediums described herein, the P2P GO may operate in a multi-channel concurrent mode of operation, and the P2P GO may communicate with an access point (AP) during the identified absence period. The P2P GO may communicate with the AP during the absence period using a first frequency band that at least partially overlaps with a second frequency band used by the client devices to communicate with the P2P GO.

The P2P GO may perform channel scanning during the identified absence period. Also, the legacy wireless beacon may be undecodable by the P2P client device. The client devices may be prohibited from accessing a wireless communication channel during the identified absence period based at least in part on the P2P NoA or the IE of the legacy wireless beacon.

The P2P NoA may be transmitted in a beacon frame from the P2P GO to the client devices. The client devices and the P2P GO may communicate using a 2.4 GHz radio band. Also, the IE indicating the absence period may be transmitted in a probe response frame to the client devices. The IE indicating the absence period may include a start time for the absence period, a duration of the absence period, and an interval between the absence period and successive absence periods. Also, the legacy wireless beacon may be transmitted during an active period in which the P2P GO communicates with the client devices prior to the absence period. A low power mode of the legacy client device may be triggered during the absence period by transmitting the legacy wireless beacon.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 shows a block diagram of an information element (IE) indicating one or more absence periods, in accordance with various aspects of the present disclosure;

DETAILED DESCRIPTION

Figure 1:
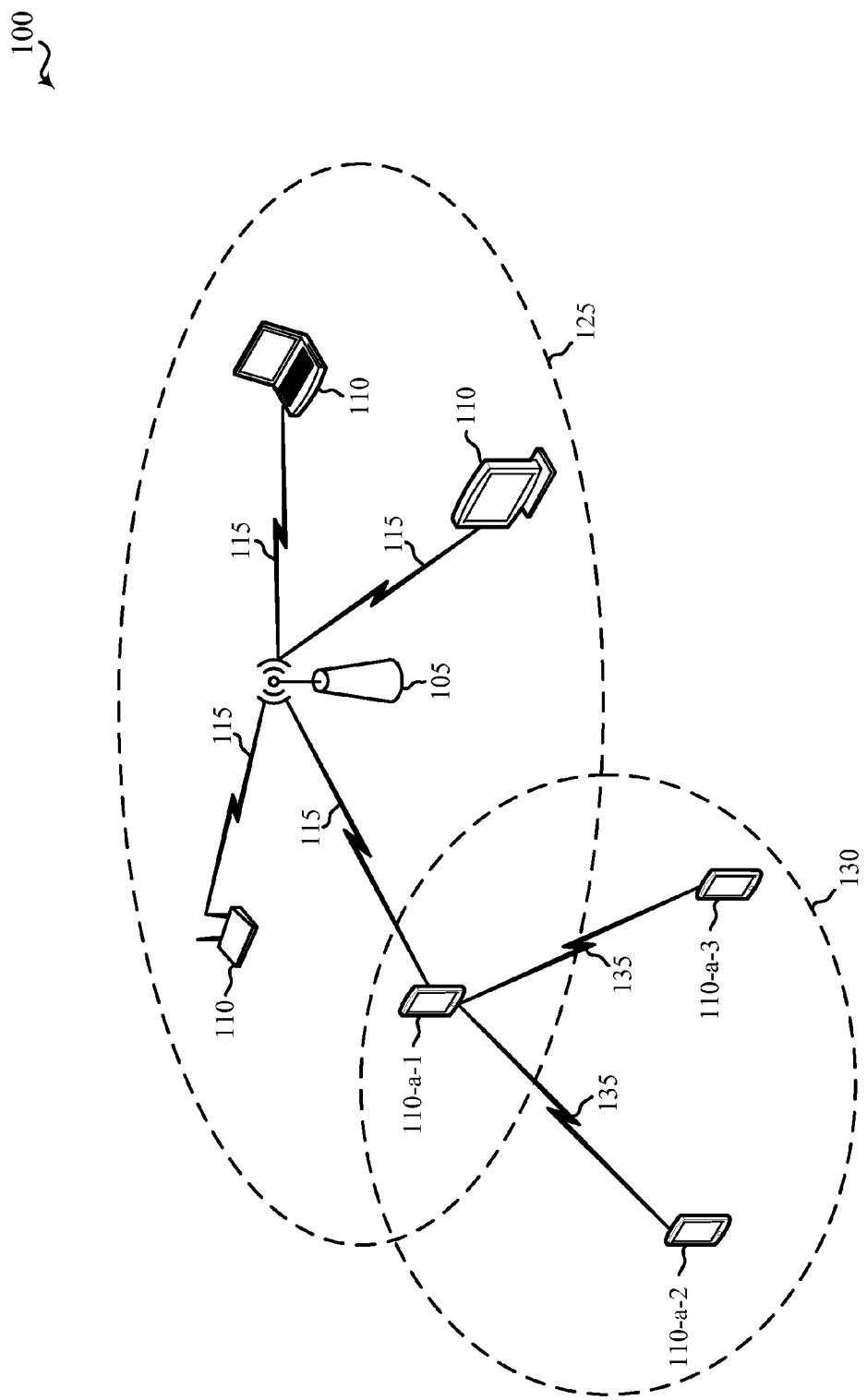
FIG. 1 shows a diagram of a wireless communication system, in accordance with various aspects of the present disclosure.

The described features generally relate to improved systems, methods, apparatuses, and computer program products for peer-to-peer (P2P) group owner (GO) multi-channel concurrent (MCC) operation and an associated absence period indication for legacy client devices. The P2P GO may communicate with client devices wirelessly coupled with the P2P GO, such as by receiving data from and sending data to the client devices, with the client devices including one or both of P2P capable client devices and legacy wireless client devices that do not support the P2P protocol. The P2P GO may also be configured to perform additional operations that make the P2P GO unavailable for receiving transmissions from the client devices, with the time during which the P2P GO is thus unavailable being referred to herein as an absence period. One example of such an absence period may be when the P2P GO sends data to and receives data from a conventional AP with the P2P GO acting as a STA relative to the conventional AP, which may be referred to as multi-channel concurrent (MCC) operation. Another example of an absence period may be when the P2P GO performs channel scanning to determine a best channel for the P2P GO operation or to search for additional client devices.

As described in more detail below, the P2P GO may identify these absence periods in order to provide the absence period information to the client devices of the P2P GO so that the client devices do not attempt to transmit data to the P2P GO during an indicated absence period. For devices that support the P2P protocol, the P2P GP may transmit a P2P notice of absence (NoA) indicating the absence period based on the P2P protocol signaling. Legacy wireless client devices, however, may not be able to decode or understand the P2P NoA. As such, the P2P GO conventionally cannot take absence periods to perform other functions as described above, or does so at the risk of suffering from decreased performance that may result from taking an absence period without adequately communicating the same to the legacy client devices. Accordingly, as described in more detail below, the P2P GO may transmit a new "Mute" information element (IE) indicating the absence period in a legacy wireless beacon frame when a legacy wireless client device is wirelessly coupled with the P2P GO.

In operation, the P2P GO may determine which type(s) of client devices are wirelessly coupled with the P2P GO and, based on which type(s) of client devices are wirelessly coupled with the P2P GO, may transmit one or both of the P2P NoA or the Mute IE. In those instances in which both the P2P NoA and the Mute IE are transmitted, any P2P client devices may receive and decode the P2P NoA per the P2P protocol, but may not decode the Mute IE. Non-P2P, legacy wireless client devices, however, may ignore the P2P NoA, and instead receive and decode the Mute IE. The Mute IE may be similar to the P2P NoA in that the Mute IE may provide information about when the P2P GO will be unavailable—such as a start time when the absence period(s) will start, the duration of each absence period, a number of absence periods in a single beacon interval, and so forth. In some embodiments, the legacy client devices may enter a low power mode during the announced absence periods, and in any event, may not attempt communications with the P2P GO during the absence periods. As a result, there may be power savings at the legacy wireless client devices—both because of the low power mode and because there will be fewer retransmissions at relatively higher power levels. Also, the performance of transmissions from the legacy client devices to the P2P GO may be improved because, again, there may be fewer retransmissions of the data and less throttling of the transmission speed that might otherwise occur.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described above with respect to some examples may be combined in other examples.

Referring first to FIG. 1, a block diagram 100 illustrates an example of a WLAN network 125 such as, e.g., a network implementing at least one of the IEEE 802.11 family of standards. The WLAN network 125 may include an access point (AP) 105 and wireless client devices 110, 110-a-1, such as mobile stations, personal digital assistants (PDAs), smart phones, other handheld devices, netbooks, notebook computers, tablet computers, laptops, display devices (e.g., TVs, computer monitors, etc.), printers, etc. While only one AP 105 is illustrated, the WLAN network 125 may alternatively have multiple APs 105. Each of the client devices 110, 110-a-1 wirelessly coupled with the AP 105 may also be referred to as stations (STAs), mobile stations (MSs), mobile devices, access terminals (ATs), user equipment (UE), subscriber stations (SSs), or subscriber units, and may associate and communicate with the AP 105 via a communication link 115. Each AP 105 has a geographic coverage area such that wireless client devices 110, 110-a-1 within that area can typically communicate with the AP 105. The wireless client devices 110, 110-a-1 may be dispersed throughout the geographic coverage area. Each wireless client device 110, 110-a-1 may be stationary or mobile.

Although not shown in FIG. 1, a wireless client device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) (not shown) may be used to connect APs 105 in an extended service set. A geographic coverage area for an AP 105 may be divided into sectors making up only a portion of the coverage area (not shown). The WLAN network 125 may include APs 105 of different types (e.g., metropolitan area, home network, etc.), with varying sizes of coverage areas and overlapping coverage areas for different technologies. Although not shown, other wireless devices can also communicate with the AP 105.

While the wireless client devices 110 may communicate with each other through the AP 105 using communication links 115, each wireless client device 110 may also communicate directly with other wireless client devices 110, 110-a-1, 110-a-2, 110-a-3 within or outside the WLAN network 125 via direct wireless links 135. Examples of direct WLAN wireless links 135 may include WLAN P2P (such as Wi-Fi P2P, which is also known as Wi-Fi Direct) connections, connections established by using a Wi-Fi Tunneled Direct Link Setup (TDLS) link, and other P2P group connections. The client devices 110 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections or ad hoc networks may be implemented.

FIG. 1 also illustrates an example of a second WLAN network 130, whose geographic coverage area partially or fully overlaps with the geographic coverage area of the first WLAN network 125 described above. In FIG. 1, one of the wireless client devices 110-a-1 of the first WLAN network 125 acts as a station (STA) relative to the AP 105 of the first WLAN network 125, but also acts as a P2P group owner (GO) to other wireless client devices 110-a-2, 110-a-3, which may or may not be included in the first WLAN network 125. The STA/P2P GO device 110-*a*-1 together with the wireless client devices 110-*a*-2, 110-*a*-3 wirelessly coupled with the STA/P2P GO device 110-*a*-1 form the second WLAN network 130, which may also be referred to as a P2P network 130. Although any number of any type of client device may be wirelessly coupled with the P2P GO device 110-*a*-1, FIG. 1 illustrates a single P2P capable client device 110-*a*-2 and a single legacy client device 110-*a*-3 that does not support the P2P protocol that are both wirelessly coupled with the P2P GO device 110-*a*-1.

The P2P GO device 110-*a*-1 may provide AP-like functionality (which may be referred to as a soft or software access point) to the client devices 110-*a*-2, 110-*a*-3 wirelessly coupled thereto. For example, the P2P GO device 110-*a*-1 may allow some of the devices 110-*a*-1, 110-*a*-2 to communicate directly with each other via direct wireless links 135, including receiving and transmitting data between the devices 110-*a*-1, 110-*a*-2. The P2P GO device 110-*a*-1 may also provide access to the Internet or other outside network for the client devices 110-*a*-2, 110-*a*-3 of the P2P GO device 110-*a*-1. The P2P GO device 110-*a*-1 may also communicate with the AP 105 in the first WLAN network 125 during a multi-channel concurrency (MCC) mode of operation, either to provide outside network access to the client devices 110-*a*-2, 110-*a*-3 of the P2P GO device 110-*a*-1 or for the P2P GO device 110-*a*-1 itself to access to the outside network.

The P2P GO device 110-*a*-1 may communicate with the AP 105 of the first WLAN network 125 using a first, MCC channel, and communicate with the client devices 110-*a*-2, 110-*a*-3 of the P2P GO device 110-*a*-1 using a second, P2P channel. The frequency band of the first, MCC channel and the frequency band of the second, P2P channel may not overlap in some embodiments, but in other embodiments, the frequency bands of the first and second channels may partially or fully overlap. Whether or not the frequency bands of the first and second channels overlap, the P2P GO may be unavailable for some operations during certain other operations (e.g., because the antenna(s), transceiver(s), processor(s), etc. may be in use by the currently active operation). For example, while acting as a soft AP for the client devices 110-*a*-2, 110-*a*-3 of the P2P GO device 110-*a*-1 during P2P operation, the P2P GO device 110-*a*-1 may not be available for communicating with the AP 105 of the first WLAN network. Similarly, while communicating with the AP 105 of the first WLAN network 125 in an MCC mode of operation, the P2P GO device 110-*a*-1 may not be available for communicating with the client devices 110-*a*-2, 110-*a*-3 of the P2P GO device 110-*a*-1. As another example, while performing a channel scanning operation, the P2P GO device 110-*a*-1 may not be available for communicating with the client devices 110-*a*-2, 110-*a*-3 of the P2P GO device 110-*a*-1 or for communicating with the AP 105 of the first WLAN network 125.

In some embodiments, the P2P GO device 110-*a*-1 may alternate between various operations in successive time periods. For example, the P2P GO device may operate in a P2P mode of operation during a first time period, may operate in an MCC mode of operation during a second time period, and then may repeat by operating in the P2P mode of operation during a third time period, operating in the MCC mode of operation during a fourth time period, and so forth. Other modes of operation area also contemplated. The alternating between different modes of operation may be fixed in advance, or may change dynamically depending on, for example, traffic volume in the first WLAN networks 125 and the second WLAN network 130. Regardless of how the alternating between different modes of operations is scheduled, the P2P GO device 110-*a*-1 may need to inform the client devices 110-*a*-2, 110-*a*-3 of the P2P GO device 110-*a*-1 and possibly the AP 105 of planned absences when the P2P GO device 110-*a*-1 will be unavailable for certain types of operations.

Accordingly, as described herein, the P2P GO device 110-*a*-1 may identify an absence period during which the P2P GO device 110-*a*-1 will be unavailable to, for example, receive transmissions from client devices 110-*a*-2, 110-*a*-3 wirelessly coupled with the P2P GO device 110-*a*-1. A single absence period may be identified, or a number of absence periods may be identified, which may or may not be recurring in a repeating pattern (such as every other 50 ms time slot). The P2P GO device 110-*a*-1 may then transmit a P2P notice of absence (NoA) indicating the identified absence period(s) if one or more P2P client devices (e.g., 110-*a*-2 in FIG. 1) that support a P2P protocol are wirelessly coupled with the P2P GO device 110-*a*-1. Similarly, the P2P GO device 110-*a*-1 may transmit a legacy wireless beacon including an information element (IE) indicating the absence period if one or more legacy client devices (e.g., 110-*a*-3 in FIG. 1) that do not support the P2P protocol are wirelessly coupled with the P2P GO device 110-*a*-1. In some embodiments, the P2P capable client devices 110-*a*-2 may not receive or may not decode the IE indicating the absence period in the legacy wireless beacon, and the legacy client devices 110-*a*-3 may not receive or may not decode the P2P NoA transmitted by the P2P GO device 110-*a*-1.

Either or both of the P2P NoA and the IE indicating the absence period may be transmitted by the P2P GO device 110-*a*-1 in a beacon frame in some embodiments, and may additionally or alternatively be transmitted by the P2P GO device 110-*a*-1 in a probe response frame in other embodiments. As described in more detail below with reference to FIG. 4, the IE indicating the absence period and transmitted in the legacy wireless beacon may be referred to as a Mute IE, and may include various types of information about the absence period(s) identified by the P2P GO device 110-*a*-1. For example, the Mute IE may, similar to the P2P NoA, include a start time (of the absence period or of a certain timing pattern), a duration of the absence period, and, in those embodiments with multiple, repeating absence periods, an interval between successive absence periods. The Mute IE and the P2P NoA may, with respect to the legacy client device 110-*a*-3 and the P2P client device 110-*a*-2 respectively, serve to prohibit the respective client devices 110-*a*-3, 110-*a*-2 from accessing the wireless communication channel during the identified absence period(s), and may additionally or alternatively trigger a low power mode of the respective client devices 110-*a*-3, 110-*a*-2 during the identified absence period(s).

Figure 2:
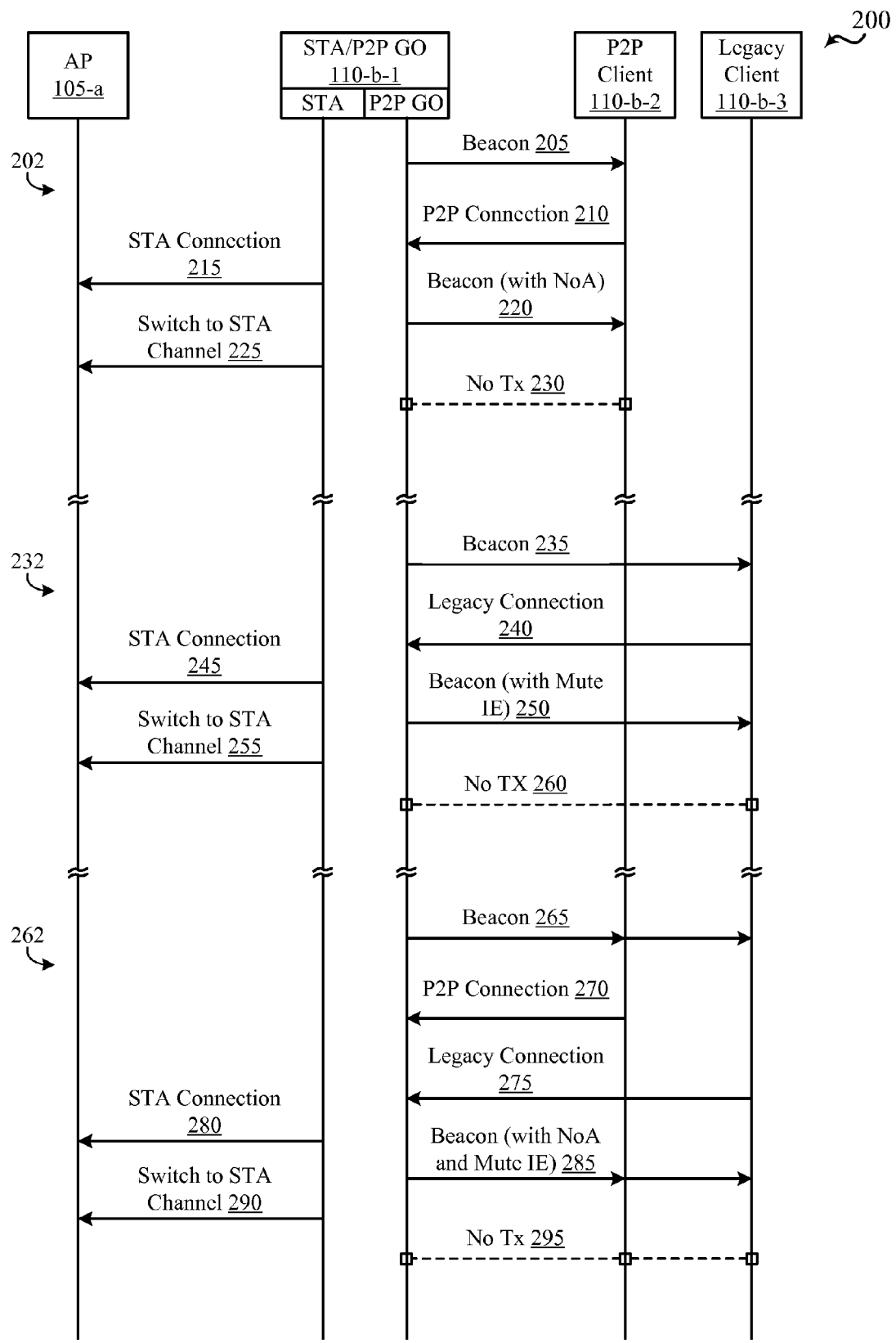
FIG. 2 shows a flow block diagram of wireless communications, in accordance with various aspects of the present disclosure.

Referring now to FIG. 2, a flow block diagram 200 illustrates several call flows 202, 232, 262 for wireless communication between a STA/P2P GO device 110-*b*-1, a conventional access point (AP) 105-*a*, a P2P client device 110-*b*-2 wirelessly coupled with the P2P GO device 110-*b*-1, and a legacy client device 110-*b*-3 wirelessly coupled with the P2P the P2P GO device 110-*b*-1, in accordance with various examples. The AP 105-*a* and STA/P2P GO device 110-*b*-1 may be associated with a first WLAN network (such as the first WLAN network 125 in FIG. 1), and may be examples of aspects of the AP 105 and STA/P2P GO device 110-*a*-1 in FIG. 1, respectively. Similarly, the STA/P2P GO device 110-*b*-1 and the client devices 110-*b*-2, 110-*b*-3 of the STA/P2P GO device 110-*b*-1 may be associated with a second, P2P WLAN network (such as the second WLAN network 130 in FIG. 1), and may be examples of aspects of the STA/P2P GO device 110-*a*-1 and client devices 110-*a*-2, 110-*a*-3 in FIG. 1, respectively. As illustrated in FIG. 2, the STA/P2P GO device 110-*b*-1 may be considered to have both STA functionality relative to the AP 105-*a*, and to have P2P GO functionality relative to the client devices 110-*b*-2, 110-*b*-3 of the P2P GO device 110-*b*-1.

In a first call flow 202 illustrated in FIG. 2, at least one P2P client device 110-*b*-2 that supports the P2P protocol is wirelessly coupled with the STA/P2P GO device 110-*b*-1, but no legacy client devices 110-*b*-3 are wirelessly coupled with the STA/P2P GO device 110-*b*-1. In this arrangement, the STA/P2P GO device 110-*b*-1 may, in performing its P2P GO role to the P2P client device 110-*b*-2, transmit a beacon to the P2P client device 110-*b*-2 at 205, which may be a standard WLAN beacon including various timing information and other control and configuration parameters. Because the STA/P2P GO device 110-*b*-1 does not, at 205, contemplate being unavailable to the P2P client device 110-*b*-2 (by, for example, communicating with AP 105-*a* in an MCC mode of operation), the beacon sent at 205 may not include any indication of upcoming absence periods. At 210, the P2P client device 110-*b*-2 initiates a P2P wireless communication link (e.g., 135 in FIG. 1) with the STA/P2P GO device 110-*b*-1 based on the parameters in the beacon sent at 205.

At some later point in time, the STA/P2P GO device 110-*b*-1 begins at 215 to prepare for a STA connection with the AP 105-*a* (e.g., for MCC operations). The STA/P2P GO device 110-*b*-1 accordingly identifies the absence period(s) corresponding to the STA connection(s), and transmits a P2P NoA in the beacon frame to the P2P client device 110-*b*-2 at 220, with the P2P NoA indicating the identified absence period(s). The STA/P2P GO device 110-*b*-1 can then switch to the STA channel at 225 in order to communicate with the AP 105-*a* in an MCC mode of operation. During the absence period(s) indicated in the P2P NoA corresponding to the MCC mode of operation, the P2P client device 110-*b*-2 honors the P2P NoA at 230 by not transmitting any data to the STA/P2P GO device 110-*b*-1 using the P2P channel. The P2P client device 110-*b*-2 may also enter a low power mode at 230 based on the absence period(s) indicated in the P2P NoA in order to, for example, conserve power. While not shown in FIG. 2, the STA/P2P GO device 110-*b*-1 may continue to transmit a P2P NoA in the WLAN beacon frame for as long as the STA/P2P GO device 110-*b*-1 contemplates a STA/MCC connection with the AP 105-*a*. If communication with the AP 105-*a* as a STA in an MCC mode of operation is no longer needed, the STA/P2P GO device 110-*b*-1 may stop including the P2P NoA in future beacons, and the P2P client device may continue operation without needing to honor any absence periods.

In a second call flow 232 illustrated in FIG. 2, at least one legacy client device 110-*b*-3 that does not support the P2P protocol is wirelessly coupled with the STA/P2P GO device 110-*b*-1, but no P2P client devices 110-*b*-2 are wirelessly coupled with the STA/P2P GO device 110-*b*-1. In this arrangement, the STA/P2P GO device 110-*b*-1 may, in performing its soft AP role to the legacy client device 110-*b*-3, transmit a beacon to the legacy client device 110-*b*-3 at 235, which may be a standard WLAN beacon including various timing information and other control and configuration parameters. Because the STA/P2P GO device 110-*b*-1 does not, at 235, contemplate being unavailable to the legacy client device 110-*b*-3 (by, for example, communicating with AP 105-*a* in an MCC mode of operation), the beacon sent at 235 may not include any indication of upcoming absence periods. At 240, the legacy client device 110-*b*-3 initiates a legacy wireless communication link (e.g., 135 in FIG. 1) directly with the STA/P2P GO device 110-*b*-1 based on the parameters in the beacon sent at 235, with the legacy client device 110-*b*-3 acting as a station (STA) relative to the P2P GO device 110-*b*-1, which in turn acts as a soft AP to the legacy client device 110-*b*-3.

At some later point in time, the STA/P2P GO device 110-*b*-1 begins at 245 to prepare for a STA connection with the AP 105-*a* (e.g., for MCC operations). The STA/P2P GO device 110-*b*-1 accordingly identifies the absence period(s) corresponding to the STA connection of the STA/P2P GO device to the AP 105-*a*, and transmits an information element indicating the absence period(s) (which may be referred to herein as a "Mute IE") in the beacon frame to the legacy client device 110-*b*-3 at 250. The STA/P2P GO device 110-*b*-1 can then switch to the STA channel at 255 in order to communicate with the AP 105-*a* in an MCC mode of operation. During the absence period(s) indicated in the Mute IE corresponding to the MCC mode of operation, the legacy client device 110-*b*-3 honors the Mute IE at 260 by not transmitting any data to the STA/P2P GO device 110-*b*-1 using the P2P channel that otherwise wirelessly couples the STA/P2P GO device 110-*b*-1 and the legacy client device 110-*b*-3. The legacy client device 110-*b*-3 may also enter a low power mode at 260 based in part on the absence period(s) indicated in the Mute IE in order to, for example, conserve power. While not shown in FIG. 2, the STA/P2P GO device 110-*b*-1 may continue to transmit a Mute IE in the WLAN beacon frame for as long as the STA/P2P GO device 110-*b*-1 contemplates a STA/MCC connection with the AP 105-*a*. If communication with the AP 105-*a* as a STA in an MCC mode of operation is no longer needed, the STA/P2P GO device 110-*b*-1 may stop including the Mute IE in future beacons, and the legacy client device may continue operation without needing to honor any absence periods.

In a third call flow 262 illustrated in FIG. 2, at least one P2P client device 110-*b*-2 that supports the P2P protocol is wirelessly coupled with the STA/P2P GO device 110-*b*-1, and at least one legacy client device 110-*b*-3 that does not support the P2P protocol is also wirelessly coupled with the STA/P2P GO device 110-*b*-1. In this arrangement, the STA/P2P GO device 110-*b*-1 may, in performing its soft AP role to the legacy client device 110-*b*-3 and its P2P GO role to the P2P client device 110-*b*-2, transmit a beacon at 265 to the P2P client device 110-*b*-2 and the legacy client device 110-*b*-3, which may be a standard WLAN beacon including various timing information and other control and configuration parameters. Because the STA/P2P GO device 110-*b*-1 does not, at 265, contemplate being unavailable to the P2P client device 110-*b*-2 or the legacy client device 110-*b*-3 (by, for example, communicating with AP 105-*a* in an MCC mode of operation), the beacon sent at 265 may not include any indication of upcoming absence periods. At 270, the P2P client device 110-*b*-2 initiates a P2P wireless communication link with the STA/P2P GO device 110-*b*-1 based in part on the parameters in the beacon sent at 265. Similarly, at 275, the legacy client device 110-*b*-3 also initiates a legacy wireless communication link (e.g., 135 in FIG. 1) directly with the STA/P2P GO device 110-*b*-1 based in part on the parameters in the beacon sent at 265.

At some later point in time, the STA/P2P GO device 110-*b*-1 begins at 280 to prepare for a STA connection with the AP 105-*a* (e.g., for MCC operations). The STA/P2P GO device 110-*b*-1 accordingly identifies the absence period(s)

corresponding to the STA connection(s), and transmits at 285 a beacon frame to the P2P client device 110-*b*-2 and the legacy client device 110-*b*-3, with the beacon frame including both a P2P NoA indicating the identified absence period (s) and a Mute ID indicating the absence period(s). The STA/P2P GO device 110-*b*-1 can then switch to the STA channel at 290 in order to communicate with the AP 105-*a* in an MCC mode of operation. During the absence period(s) indicated in the P2P NoA and Mute IE corresponding to the MCC mode of operation, the P2P client device 110-*b*-2 and the legacy client device 110-*b*-3 both honor the absence period at 295 by not transmitting any data to the STA/P2P GO device 110-*b*-1. The P2P client device 110-*b*-2 and the legacy client device 110-*b*-3 may each enter a low power mode at 295 based on the absence period(s) indicated in the P2P NoA/Mute IE in order to, for example, conserve power. While not shown in FIG. 2, the STA/P2P GO device 110-*b*-1 may continue to transmit the P2P NoA and Mute IE in the WLAN beacon frame for as long as the STA/P2P GO device 110-*b*-1 contemplates a STA/MCC connection with the AP 105-*a*. If communication with the AP 105-*a* as a STA in an MCC mode of operation is no longer needed, the STA/P2P GO device 110-*b*-1 may stop including the P2P NoA and Mute IE in future beacons, and the P2P client device and the legacy client device may continue operation without needing to honor any absence periods.

Although FIG. 2 illustrates STA connections with the AP 105-*a* by the STA/P2P GO device 110-*b*-1, other operations are also contemplated (as described above) during which the STA/P2P GO device 110-*b*-1 may be unavailable to the client devices 110-*c*-2, 110-*c*-3 of the STA/P2P GO device 110-*b*-1, such as during a channel scanning operation. Also, while FIG. 2 illustrates the transmission of the P2P NoA or Mute IE in a WLAN beacon, it will also be appreciated that the P2P NoA or the Mute IE may additionally or alternatively be transmitted in a probe response frame, as mentioned above.

Figure 3:
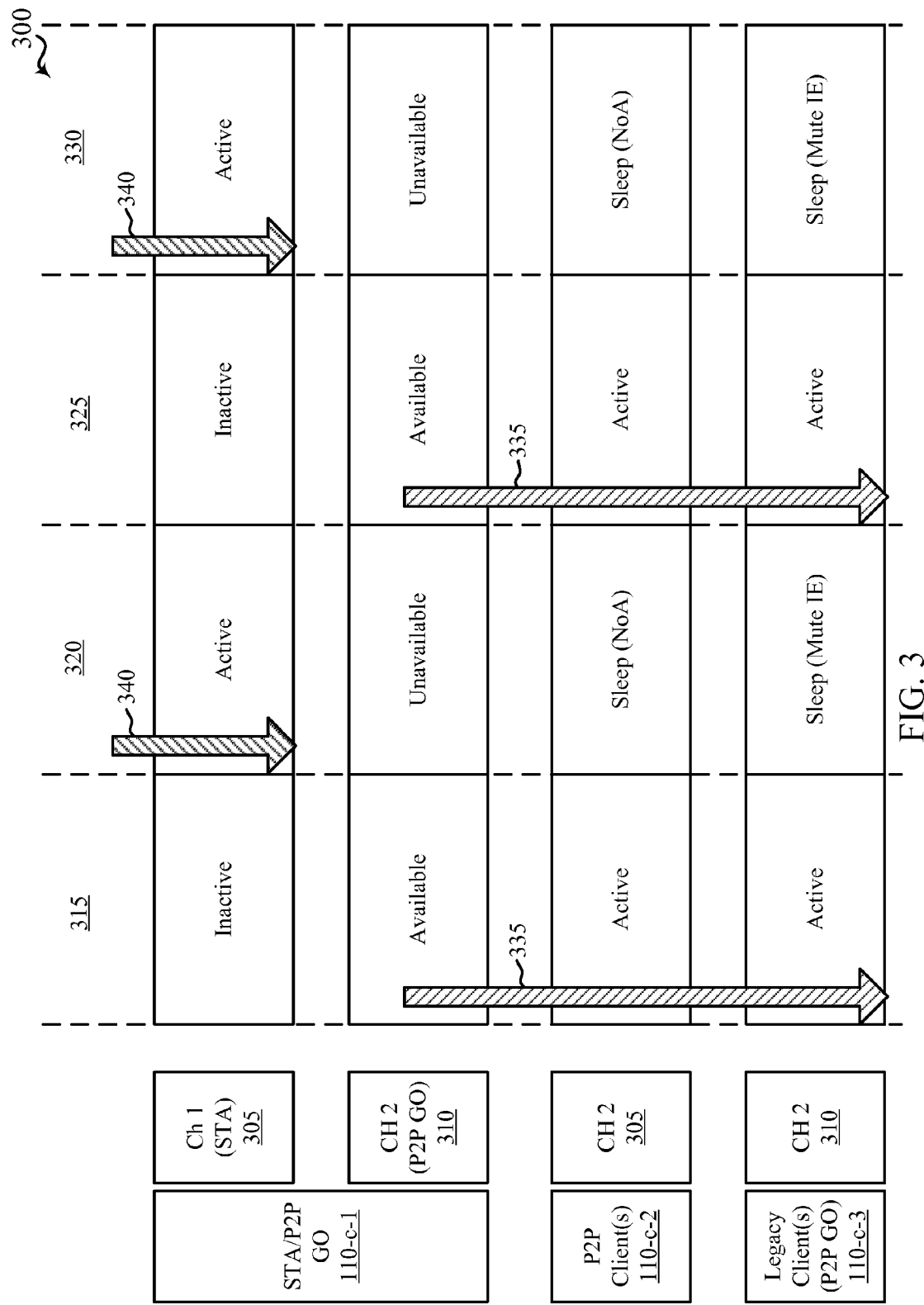
FIG. 3 shows a timing block diagram of wireless communication, in accordance with various aspects of the present disclosure.

FIG. 3 shows a timing block diagram 300 for wireless communication between a STA/P2P GO device 110-*c*-1, a conventional AP (not shown in FIG. 3), a P2P client device 110-*c*-2 wirelessly coupled with the P2P GO device 110-*c*-1, and a legacy client device 110-*c*-3 wirelessly coupled with the P2P the P2P GO device 110-*c*-1, in accordance with various examples. The AP and STA/P2P GO device 110-*c*-1 may be associated with a first WLAN network (such as the first WLAN network 125 in FIG. 1), and may be examples of aspects of the respective devices in FIGS. 1 and 2. Similarly, the STA/P2P GO device 110-*c*-1 and the client devices 110-*c*-2, 110-*c*-3 of the STA/P2P GO device 110-*c*-1 may be associated with a second, P2P WLAN network (such as the second WLAN network 130 in FIG. 1), and may be examples of aspects of the respective devices in FIGS. 1 and 2. As illustrated in FIG. 3, the STA/P2P GO device 110-*c*-1 may be considered to have both STA functionality relative to the AP, and to have P2P GO and soft AP functionality relative to the client devices 110-*c*-2, 110-*c*-3 of the STA/P2P GO device 110-*c*-1.

FIG. 3 shows two different wireless access channels 305, 310, and which of the devices 110-*c*-1, 110-*c*-2, 110-*c*-3 are active in the two channels 305, 310 during four consecutive time periods 315, 320, 325, 330. The first channel 305 may be for MCC communications between the STA/P2P GO device 110-*c*-1 and a conventional AP (which is not shown in FIG. 3, but may be, for example, one of the APs 105, 105-*a* shown in FIG. 1 or 2). The second channel 310 may be for direct, P2P wireless links between the devices 110-*c*-1, 110-*c*-2, 110-*c*-3 shown in FIG. 3. In some embodiments, either or both of the first channel 305 or the second channel 310 may be in a 2.4 GHz radio band, and the frequency bands of the first channel 305 and the second channel 310 may or may not overlap in whole or in part.

FIG. 3 also shows two different beacons 335, 340. One beacon 335 is transmitted by the STA/P2P GO device 110-*c*-1 using the second channel 310 to the client devices 110-*c*-2, 110-*c*-3 of the STA/P2P GO device 110-*c*-1, and may include one or both of a notice of absence (NoA) or Mute IE, as described above. This first beacon 335 transmitted by the STA/P2P GO device 110-*c*-1 to the client devices 110-*c*-2, 110-*c*-3 of the STA/P2P GO device 110-*c*-1 may be transmitted during active periods in which the STA/P2P GO device 110-*c*-1 communicates with the client devices 110-*c*-2, 110-*c*-3 of the STA/P2P GO device 110-*c*-1, but not the conventional AP. The other beacon 340 is transmitted by the conventional AP and received by the STA/P2P GO device 110-*c*-1 using the first channel 305. This other beacon 340 may be transmitted by the conventional AP during periods in which the STA/P2P GO device 110-*c*-1 communicates with the conventional AP, but does not communicate with the client devices 110-*c*-2, 110-*c*-3 of the STA/P2P GO device 110-*c*-1.

Turning now to the specific time periods 315, 320, 325, 330, the timing diagram 300 illustrated in FIG. 3 will be described in more detail. During the first time period 315, the STA/P2P GO device 110-*c*-1 may communicate with (e.g., receive data from or transmit data to) the client devices 110-*c*-2, 110-*c*-3 of the STA/P2P GO device 110-*c*-1, which may include at least one P2P client device 110-*c*-2, at least one legacy client device 110-*c*-3, or both. The STA/P2P GO device 110-*c*-1 may communicate with the client devices 110-*c*-2, 110-*c*-3 using direct WLAN communication links, and thus may not communicate with the client devices 110-*c*-2, 110-*c*-3 of the STA/P2P GO device 110-*c*-1 via a conventional AP. Thus, as illustrated in FIG. 3, the STA/P2P GO device 110-*c*-1 is available on the second channel 310 during the first time period 315, and one or both of the client devices 110-*c*-2, 110-*c*-3 may actively communicate with the STA/P2P GO device 110-*c*-1 using the second channel 310. Because the STA/P2P GO device 110-*c*-1 provides AP-like and P2P GO functionality to the client devices 110-*c*-2, 110-*c*-3 of the STA/P2P GO device 110-*c*-1, the STA/P2P GO device 110-*c*-1 may transmit a beacon 335 to the client devices 110-*c*-2, 110-*c*-3 of the STA/P2P GO device 110-*c*-1 during the first time period 315. The beacon 335 may include a number of different configuration or control characteristics, including timing information. For example, as described above, the beacon 335 may include a P2P NoA indicating one or more upcoming absence periods (e.g., the second time period 320, the fourth time period 330, or both) if at least one P2P client device 110-*c*-2 is wirelessly coupled with the STA/P2P GO device 110-*c*-1. Similarly, the beacon 335 may include a Mute IE indicating one or more upcoming absence periods (e.g., the second time period 320, the fourth time period 330, or both) if at least one legacy client device 110-*c*-3 is wirelessly coupled with the STA/P2P GO device 110-*c*-1. As also illustrated in FIG. 3, the STA/P2P GO device 110-*c*-1 is inactive with respect to the first channel 305 and the conventional AP during the first time period 315.

During the second time period 320, the STA/P2P GO device 110-*c*-1 may actively communicate with (e.g., receive data from or transmit data to) the conventional AP using the first channel 305, with the STA/P2P GO device 110-*c*-1 acting as a station (STA) relative to the conventional AP. During this time, however, the STA/P2P GO device 110-c-1 may be unavailable to communicate with the client devices 110-c-2, 110-c-3 of the STA/P2P GO device 110-c-1. Thus, as also illustrated in FIG. 3, the STA/P2P GO device 110-c-1 is unavailable or absent with respect to the client devices 110-c-2, 110-c-3 of the STA/P2P GO device 110-c-1 and the second channel 310 during the second time period 320, and the client devices 110-c-2, 110-c-3 may be in a low power mode triggered by the respective NoA or Mute IE received in the beacon 335 during the first time period 315. Also, because the STA/P2P GO device 110-c-1 acts as a STA relative to the conventional AP, the STA/P2P GO device 110-c-1 may receive a beacon 340 from the conventional AP during the second time period 320. The beacon 340 may include a number of different configuration or control characteristics, including timing information.

The third time period 325 in FIG. 3 may be substantially similar to the first time period 315 in that the STA/P2P GO device 110-c-1 is available to communicate with the client devices 110-c-2, 110-c-3 of the STA/P2P GO device 110-c-1 using the second channel 310, but inactive with respect to the conventional AP using the first channel 305. The fourth time period 330 in FIG. 3 may be substantially similar to the second time period 320 in that the STA/P2P GO device 110-c-1 is available to actively communicate with the conventional AP using the first channel 305, but is unavailable or absent with respect to the client devices 110-c-2, 110-c-3 of the STA/P2P GO device 110-c-1. In this manner, FIG. 3 shows a recurring pattern of the STA/P2P GO device 110-c-1 alternating between an MCC mode of operation (during the second time period 320 and the fourth time period 330) and a P2P mode of operation (during the first time period 315 and the third time period 325).

FIG. 4 shows a block diagram of an information element (IE) 405, which may be referred to herein as a Mute IE 405, indicating one or more absence periods, in accordance with various aspects of the present disclosure. The Mute IE 405 may be transmitted by a P2P GO device (e.g., device 110-a-1 in FIG. 1, device 110-b-1 in FIG. 2, device 110-c-1 in FIG. 3, etc.) in a legacy wireless beacon (e.g., beacons 235, 265 in FIG. 2, beacon 335 in FIG. 3, etc.) to legacy client devices (e.g., device 110-a-3 in FIG. 1, 110-b-3 in FIG. 2, 110-c-3 in FIG. 3, etc.) in order to inform them of upcoming absence period(s) during which the P2P GO device will be unavailable to communicate with the legacy client devices.

As illustrated in FIG. 4, the Mute IE 405 may include a header 410, a duration parameter 415, an interval parameter 420, and a start time parameter 425. The header 410 may identify the IE as being a Mute IE (as compared to another type of IE) so that devices that receive the Mute IE 405 can determine whether they need to decode and consider the information contained in the Mute IE. The header 410 may also indicate the length of the Mute IE 405 in some embodiments. The duration parameter 415 may indicate a duration of a single absence period, whereas the interval parameter 420 may indicate an interval between successive absence periods (if any) in a single beacon interval, and the start time parameter 425 may indicate the start time for the first absence period following the beacon in which the Mute IE was transmitted. In some embodiments, the mute IE 405 and its various fields 410, 415, 420, 425 may include similar absence period timing information as a P2P NoA—in these embodiments, the P2P GO may be able to communicate similar absence period information to disparate devices using different signaling mechanisms, which may reduce the discrepancies and improve the overall coordination between the P2P GO device and the client devices 110-c-2, 110-c-3 of the STA/P2P GO device 110-c-1.

In some embodiments, the Mute IE 405 may not be decoded by P2P client devices (e.g., devices 110-a-2 in FIG. 1, 110-b-2 in FIG. 2, 110-c-2 in FIG. 3, etc.). For example, the Mute IE 405 may be undecodable by the P2P client devices because the Mute IE is transmitted using different resources (e.g., time or frequency) than those used by the P2P client devices. As another example, the header 410 of the Mute IE may indicate to the P2P client devices that they do not need to decode that particular type of IE or instruct the client devices not to decode that particular type of IE, or the header 410 may not be included in an IE index of known IE types associated with the P2P client devices. The P2P client devices may, however, be configured to receive, decode, and consider the absence information indicated in a P2P NoA received from a P2P GO device. On the other hand, legacy wireless clients (e.g., devices 110-a-3 in FIG. 1, 110-b-3 in FIG. 2, 110-c-3 in FIG. 3, etc.) may receive and decode the Mute IE 405 in order to consider the absence information indicated in the Mute IE, but may not be able to decode or understand the P2P NoA received from a P2P GO device. In this manner, the P2P client devices may only decode and consider the P2P NoA, while the non-P2P legacy client devices may only decode and consider the Mute IE, which may result in power savings in both the P2P and non-P2P legacy devices. Also, because each of the P2P and non-P2P legacy client devices may only consider (e.g., implement) timing information from either the P2P NoA or the Mute IE, the P2P and non-P2P legacy devices may not be confused as to which of the P2P NoA or Mute IE are to be followed, which might occur if the P2P or the non-P2P legacy devices decoded both the P2P NoA and the Mute IE.

Figure 5:
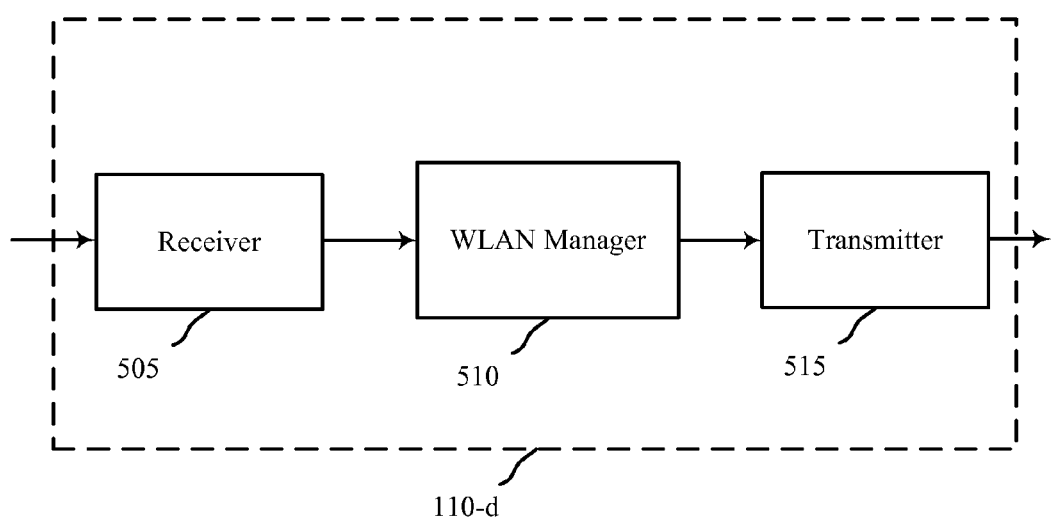
FIG. 5 shows a block diagram of a device configured for use in wireless communication, in accordance with various aspects of the present disclosure.

FIG. 5 shows a block diagram 500 of a device 110-d for use in wireless communication, in accordance with various aspects of the present disclosure. The device 110-d may be an example of aspects of devices 110, 110-a-1, 110-a-2, 110-a-3, 110-b-1, 110-b-2, 110-b-3, 110-c-1, 110-c-2, 110-c-3 described above with reference to FIGS. 1-4. The device 110-d may include a receiver 505, a WLAN manager 510, and a transmitter 515. The device 110-d may also be or include a processor (not shown). Each of these components may be in communication with each other. The device 110-d, through the receiver 505, the WLAN manager 510, and the transmitter 520, may be configured to perform functions described herein.

The components of the device 110-d may, individually or collectively, be implemented using application-specific integrated circuits (ASICs) adapted to perform some or all of the applicable functions in hardware. Alternatively, the functions may be performed by other processing units (or cores), on an integrated circuit. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by general or application-specific processors.

The receiver 505 may receive information such as packets, user data, or control information associated with various information channels (e.g., control channels, data channels, etc.). The receiver 505 may be configured to receive a P2P NoA or Mute IE when in embodiments of the device 110-e in which the device 110-e is a P2P client device that is wirelessly coupled with a P2P GO or is a legacy client device that is wirelessly coupled with a P2P GO. Information may be passed on to the WLAN manager 510, and to other components of the device 110-d.

The WLAN manager 510 may be configured to manage the participation of the device 110-*d* in a WLAN network, which may be a conventional AP-STA WLAN network, a P2P WLAN network, or both. In those embodiments in which the device 110-*e* is a P2P GO, the WLAN manager 510 may be configured to identify an absence period during which the P2P GO is unavailable to receive transmissions from client devices wirelessly coupled with the P2P GO, to transmit a P2P notice of absence (NoA) indicating the absence period if the client devices wirelessly coupled with the P2P GO device include a P2P client device that supports a P2P protocol, and to transmit a legacy wireless beacon including an information element (IE) (which may be referred to as a Mute IE) indicating the absence period if the client devices wirelessly coupled with the P2P GO device include a legacy client device that does not support the P2P protocol. In those embodiments in which the device 110-*e* is a P2P client device wirelessly coupled with a P2P GO, the WLAN manager 510 may be configured to receive and decode a P2P NoA indicating an absence period during which the P2P GO is unavailable to receive transmissions from the P2P client device, and may further be configured to not decode any Mute IEs intended for legacy client devices. In those embodiments in which the device 110-*e* is a legacy client device wirelessly coupled with a P2P GO, the WLAN manager 510 may be configured to receive and decode a Mute IE indicating an absence period during which the P2P GO is unavailable to receive transmissions from the legacy client device, and may further be configured to not decode any NoAs intended for P2P client devices.

The transmitter 515 may transmit signals received from other components of the device 110-*d*, including user data, control data, and so forth. The transmitter 515 may, for example, be configured to transmit a Mute IE or a P2P NoA to client devices, as described herein, when the device 110-*d* is a P2P GO device. In some examples, the transmitter 515 may be collocated with the receiver 505 in a transceiver. In some embodiments, the transmitter 515 and receiver 505 may be configured to communicate (e.g., receive and transmit data) using a 2.4 GHz radio band, whereas in other embodiments different frequency bands are also contemplated.

Figure 6:
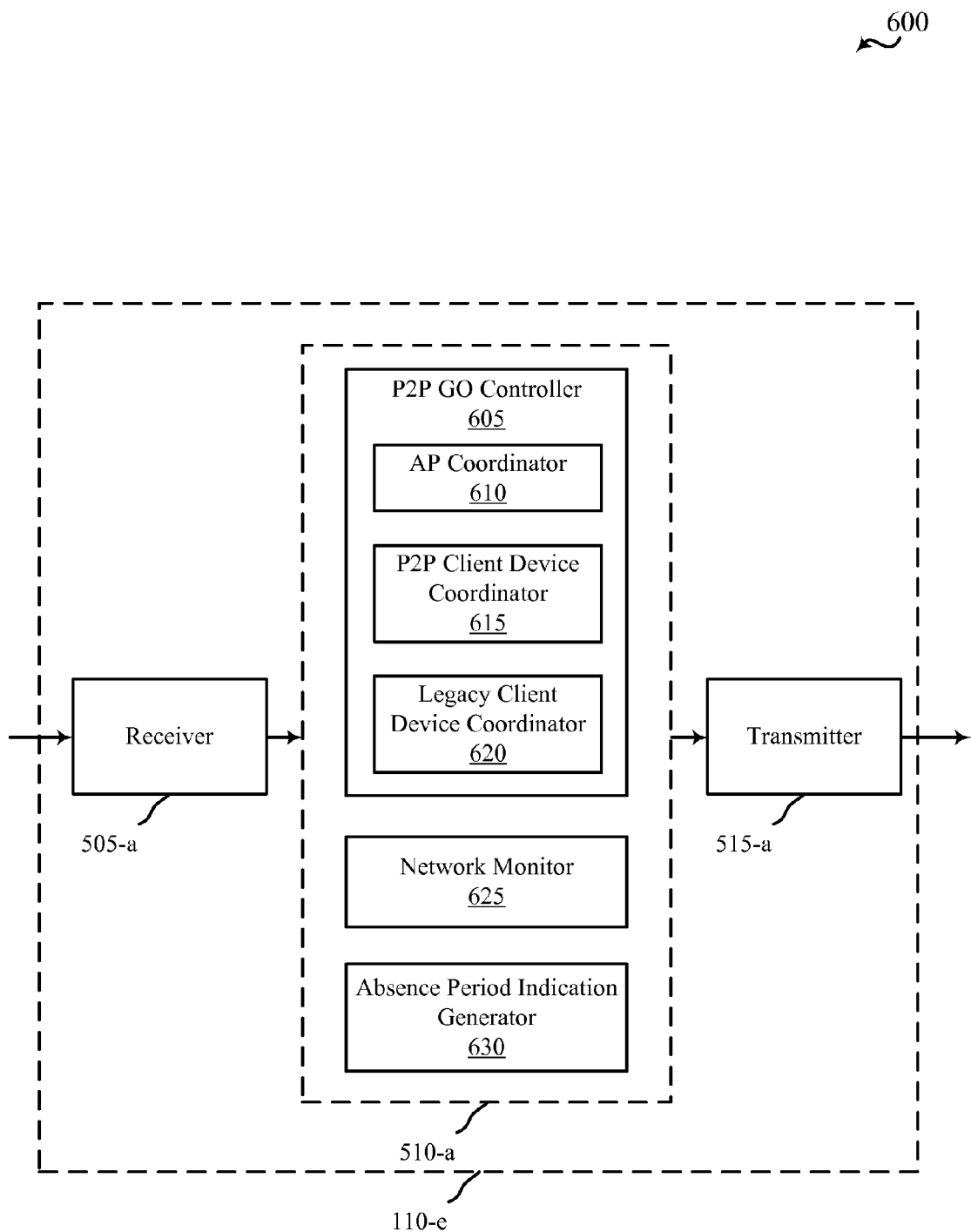
FIG. 6 shows a block diagram of a device configured for use in wireless communication, in accordance with various aspects of the present disclosure.

FIG. 6 shows a block diagram 600 of a device 110-*e* that is used in wireless communication, in accordance with various examples. The device 110-*e* may be a P2P GO device, and may be an example of aspects of the device 110-*d* described above with reference to FIG. 5. The device 110-*e* may also be an example of the P2P GO devices 110-*a*-1, 110-*b*-1, 110-*c*-1 described above with reference to FIGS. 1-4. The device 110-*e* may include a receiver 505-*a*, a WLAN manager 510-*a*, and a transmitter 515-*a*, which may be examples of the corresponding components of the device 110-*d* shown in FIG. 5. The device 110-*e* shown in FIG. 6 may also include a processor (not shown). Each of these components may be in communication with each other. The WLAN manager 510-*a* may include a P2P GO controller 605, a network monitor 625, and an absence period indication generator 630. The P2P GO controller 605 may further include an AP coordinator 610, a P2P client device coordinator 615, and a legacy client device coordinator 620. The receiver 505-*a* and the transmitter 515-*a* may perform the functions of the receiver 505 and the transmitter 515 of FIG. 5, respectively.

As mentioned above, the WLAN manager 510-*a* may be configured to identify an absence period during which the P2P GO device 110-*e* is unavailable to receive transmissions from client devices wirelessly coupled with the P2P GO device 110-*e*, to transmit a P2P notice of absence (NoA) indicating the absence period if the client devices wirelessly coupled with the P2P GO device 110-*e* include a P2P client device that supports a P2P protocol, and to transmit a legacy wireless beacon including an information element (IE) (which may be referred to as a Mute IE) indicating the absence period if the client devices wirelessly coupled with the P2P GO device 110-*e* include a legacy client device that does not support the P2P protocol. In this manner (i.e., by transmitting the P2P NoA, the Mute IE, or both), the WLAN manager 510-*a* of the P2P GO device 110-*e* may prohibit the client devices wirelessly coupled with the P2P GO device 110-*e* from accessing a wireless communication channel (e.g., to transmit data to the P2P GO device 110-*e*) during an identified absence period based at least in part on the P2P NoA or the Mute IE or both. Similarly, in this manner (i.e., by transmitting the P2P NoA, the Mute IE, or both), the WLAN manager 510-*a* of the P2P GO device 110-*e* may trigger a low power mode of legacy client devices and P2P client devices during the identified absence period based at least in part on the P2P NoA or the Mute IE or both.

The P2P GO controller 605 may be configured to identify the absence period during which the P2P GO device 110-*e* is unavailable to receive transmissions from client devices wirelessly coupled with the P2P GO device 110-*e*, whether those client devices be P2P client devices or legacy client devices.

The AP coordinator 610 may be configured to coordinate communications between the P2P GO device 110-*e* and a conventional AP, as described above with reference to FIGS. 1-3. For example, the AP coordinator 610 may be configured to cause the P2P GO device 110-*e* to communicate with a conventional AP (via receiver 505-*a* and transmitter 515-*a*) during an identified absence period in a multi-channel concurrency (MCC) mode of operation. The frequency band used to communicate between the P2P GO device 110-*e* and the AP may at least partially overlap the frequency band used to communicate between the P2P GO device 110-*e* and any client devices coupled therewith.

The P2P client device coordinator 615 may be configured to provide a P2P notice of absence (NoA) for transmission by the P2P GO device 110-*e* in the event that at least one P2P client device that supports the P2P protocol is wirelessly coupled with the P2P GO device 110-*e*, with the P2P NoA indicating the absence period identified by the P2P GO controller 605. The legacy client device coordinator 620 may be configured to provide a legacy wireless beacon including an information element (IE), such as the Mute IE described herein, for transmission by the P2P GO device 110-*e* in the event that at least one legacy client device that does not support the P2P protocol is wirelessly coupled with the P2P GO device 110-*e*, with the IE indicating the absence period identified by the P2P GO controller 605.

The network monitor 625 may be configured to monitor the WLAN network or networks associated with the P2P GO device 110-*e*. For example, in one embodiment, the network monitor 625 may be configured to perform channel scanning during an absence period identified by the P2P GO controller 605. In another embodiment, the network monitor 625 may transmit a probe response frame (in response to a monitored network condition or request), which may include a Mute IE as described herein.

The absence period indication generator 630 may be configured to generate one or several different indication(s) of absence period(s) identified by the P2P GO controller 605. The absence period indication generator 630 may generate a specific type of absence period indication based at least in part on which types of client devices are wirelessly coupled with the P2P GO device 110-*e*, as described above. For example, the absence period indication generator 630 may generate a P2P NoA when one or more P2P capable client devices are coupled with the P2P GO device 110-*e*, and may generate a Mute IE when one or more legacy client devices that are not P2P capable are coupled with the P2P GO device 110-*e*. The Mute IE generated by the absence period indication generator 630 may include, for example, a header, a start time for an identified absence period, a duration of the identified absence period, and an interval between successive absence periods (if any), as described above with reference to FIG. 4.

Still referring to FIG. 6, in some embodiments, the transmitter 515-*a* may be configured to transmit the P2P NoA, the Mute IE, or both the P2P NoA and the Mute IE, in a WLAN beacon frame from the P2P GO device 110-*e* to one or more client devices. Further, the transmitter 515-*a* may be configured to transmit the P2P NoA, the mute IE, or both the P2P NoA and the Mute IE during an active period during which the P2P GO device 110-*e* is available for communicating with P2P capable client devices, legacy, non-P2P capable client devices, or both.

Figure 7:
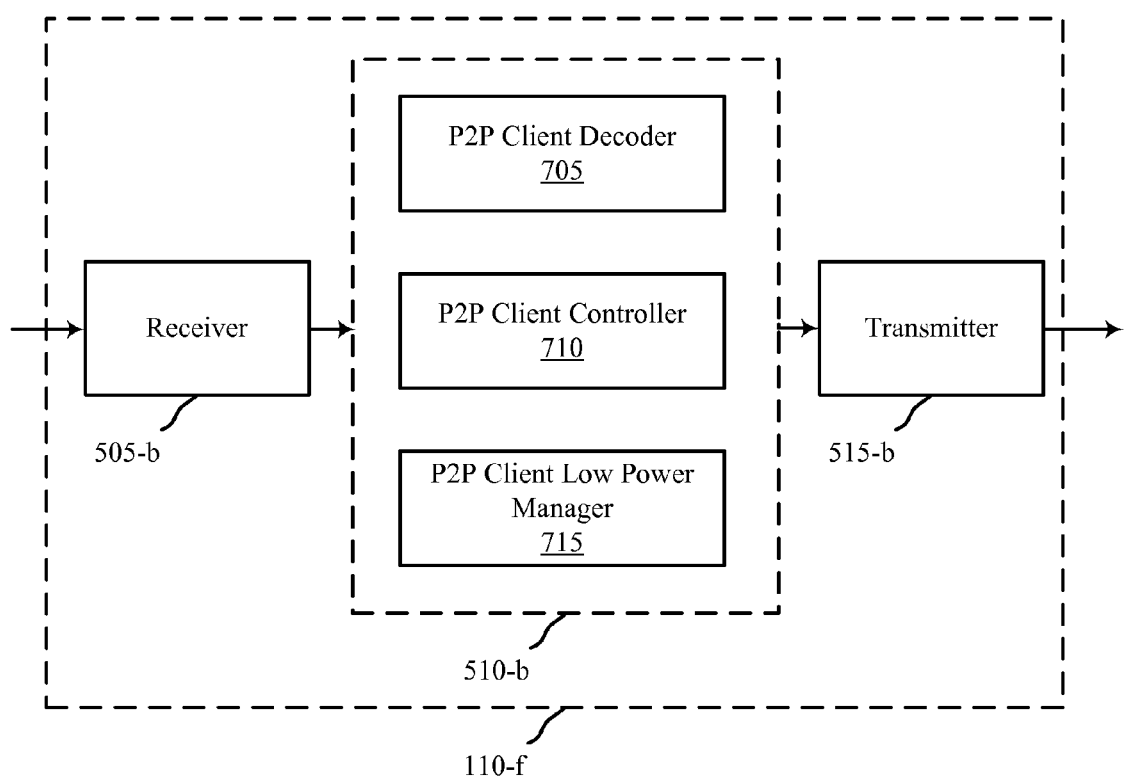
FIG. 7 shows a block diagram of a device configured for use in wireless communication, in accordance with various aspects of the present disclosure.

FIG. 7 shows a block diagram 700 of a device 110-*f* that is used in wireless communication, in accordance with various examples. The device 110-*f* may be a P2P client device, and may be an example of aspects of the device 110-*d* described above with reference to FIG. 5. The device 110-*f* may also be an example of the P2P client devices 110-*a*-2, 110-*b*-2, 110-*c*-2 described above with reference to FIGS. 1-4. The device 115-*f* may include a receiver 505-*b*, a WLAN manager 510-*b*, and a transmitter 515-*b*, which may be examples of the corresponding components of the device 110-*d* shown in FIG. 5. The device 110-*f* shown in FIG. 7 may also include a processor (not shown). Each of these components may be in communication with each other. The WLAN manager 510-*b* may include a P2P client decoder 705, a P2P client controller 710, and a P2P client low power manager 715. The receiver 505-*b* and the transmitter 515-*b* may perform the functions of the receiver 505 and the transmitter 515 of FIG. 5, respectively.

As mentioned above, the WLAN manager 510-*b* may be configured to configured to receive and decode a P2P NoA indicating an absence period during which the P2P GO is unavailable to receive transmissions from the P2P client device 110-*f*, and may further be configured to not decode any Mute IEs intended for legacy client devices.

The P2P client decoder 705 may be configured to receive and decode P2P NoAs transmitted by a P2P GO during operation, with the P2P NoAs indicating an absence period during which the P2P GO will be unavailable to receive transmissions from the P2P client device 110-*f*. The P2P client decoder 705 may not, however, be configured to receive, or may not be configured to decode Mute IEs that may also be transmitted by the P2P GO indicating the absence periods to legacy client devices. In this manner, the P2P client decoder 705 may only be configured to decode a single indication of upcoming absent periods associated with the P2P GO.

The P2P client controller 710 may be configured to control the interactions of the P2P client device 110-*f* with the P2P GO, including preventing the P2P client device 110-*f* from accessing the wireless communication channel during the absence period identified by the P2P client decoder 705 based on a received P2P NoA. The P2P client controller 710 may prevent the P2P client device 110-*f* from accessing the wireless communication channel during the absence period because the P2P client controller 710 may interpret the P2P NoA as a prohibition against accessing the channel during the identified absence period(s).

The P2P client low power manager 715 may be configured to cause the P2P client device 110-*f* to enter a low power mode (which may also be referred to as a power save mode, a doze, a sleep mode, and so forth) during an absence period identified in the P2P NoA.

Figure 8:
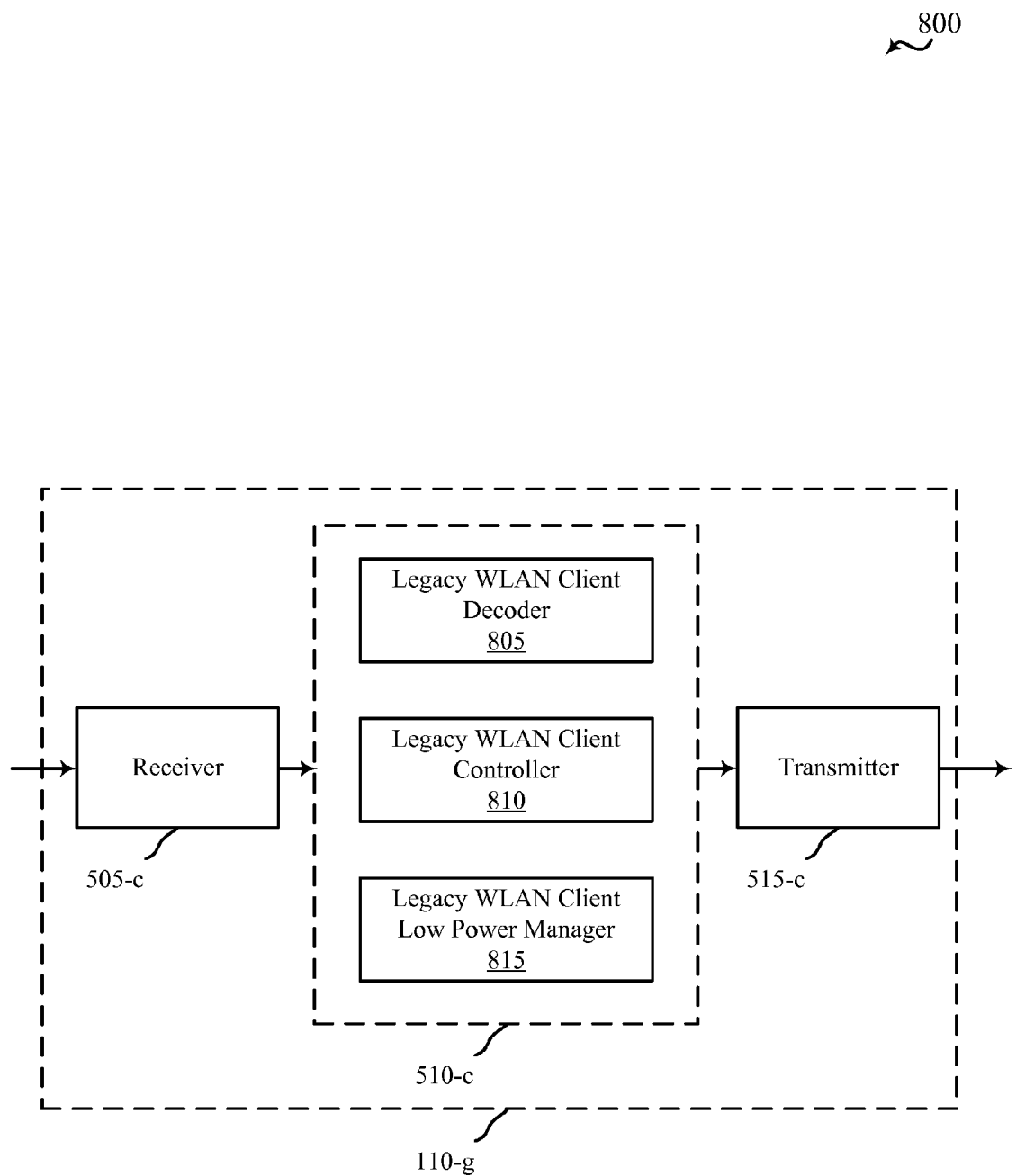
FIG. 8 shows a block diagram of a device configured for use in wireless communication, in accordance with various aspects of the present disclosure.

FIG. 8 shows a block diagram 800 of a device 110-*g* that is used in wireless communication, in accordance with various examples. The device 110-*g* may be a legacy client device, and may be an example of aspects of the device 110-*d* described above with reference to FIG. 5. The device 110-*g* may also be an example of the legacy client devices 110-*a*-3, 110-*b*-3, 110-*c*-3 described above with reference to FIGS. 1-4. The device 115-*g* may include a receiver 505-*c*, a WLAN manager 510-*c*, and a transmitter 515-*c*, which may be examples of the corresponding components of the device 110-*d* shown in FIG. 5. The device 110-*g* shown in FIG. 8 may also include a processor (not shown). Each of these components may be in communication with each other. The WLAN manager 510-*c* may include a legacy WLAN client decoder 805, a legacy WLAN client controller 810, and a legacy WLAN client low power manager 815. The receiver 505-*c* and the transmitter 515-*c* may perform the functions of the receiver 505 and the transmitter 515 of FIG. 5, respectively.

As mentioned above, the WLAN manager 510-*c* may be configured to configured to receive and decode a Mute IE indicating an absence period during which the P2P GO device is unavailable to receive transmissions from the legacy client device 110-*g*, and may further be configured to not decode any NoAs intended for P2P client devices The legacy WLAN client decoder 805 may be configured to receive and decode Mute IEs transmitted by a P2P GO during operation, with the Mute IEs indicating an absence period during which the P2P GO will be unavailable to receive transmissions from the legacy client device 110-*g*, as described above. The legacy WLAN client decoder 805 may not, however, be configured to receive, or may not be configured to decode P2P NoAs that may also be transmitted by the P2P GO indicating the absence periods to P2P capable client devices. In this manner, the legacy WLAN client decoder 805 may only be configured to decode a single indication of upcoming absent periods associated with the P2P GO.

The legacy WLAN client controller 810 may be configured to control the interactions of the legacy client device 110-*g* with the P2P GO, including preventing the legacy client device 110-*g* from accessing the wireless communication channel during the absence period identified by the legacy WLAN client decoder 805 based on a received Mute IE. The legacy WLAN client controller 810 may prevent the P2P client device 110-*g* from accessing the wireless communication channel during the absence period because the legacy WLAN client controller 810 may interpret the Mute IE as a prohibition against accessing the channel during the identified absence period(s).

The legacy WLAN client low power manager 815 may be configured to cause the legacy client device 110-*g* to enter a low power mode (which may also be referred to as a power save mode, a doze, a sleep mode, and so forth) during an absence period identified in the Mute IE.

Figure 9:
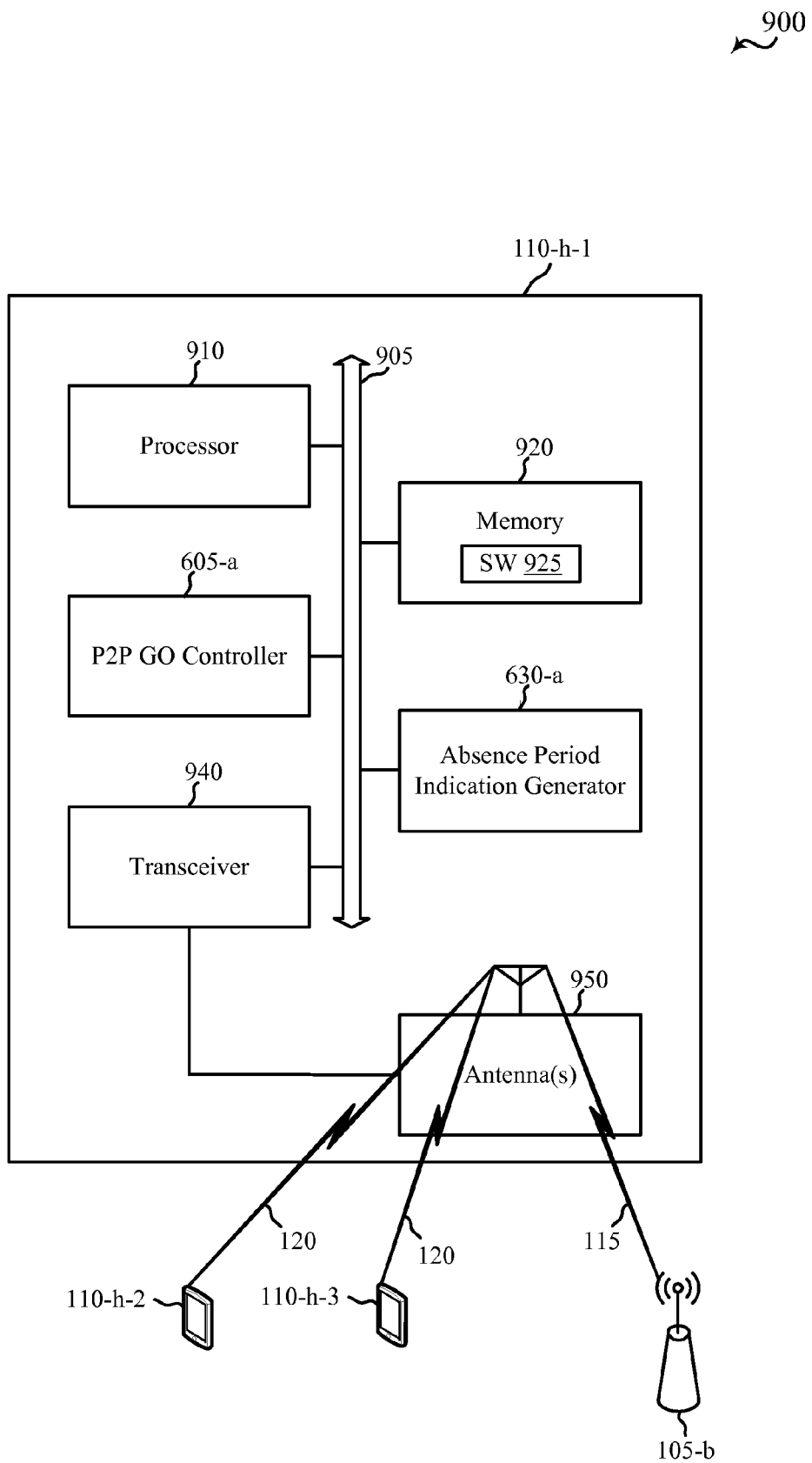
FIG. 9 shows a block diagram of an apparatus for use in a wireless communication system, in accordance with various aspects of the present disclosure.

Turning to FIG. 9, a diagram 900 is shown that illustrates a P2P GO device 110-*h*-1 for use in a wireless communication system. The P2P GO device 110-*h*-1 may have various other configurations and may be included or be part of a personal computer (e.g., laptop computer, netbook computer, tablet computer, etc.), a cellular telephone such as a smart phone, a PDA, a digital video recorder (DVR), an internet appliance, a gaming console, an e-reader, etc. The P2P GO device 110-*h*-1 may have an internal power supply (not shown), such as a small battery, to facilitate mobile operation. The P2P GO device 110-*h*-1 may be an example of aspects of the P2P GO devices 110-*a*-1, 110-*b*-1, 110-*c*-1, 110-*e* described above with reference to FIGS. 1-4 and 6, and may also be an example of aspects of the device 110-*d* described above with reference to FIG. 5.

The P2P GO device 110-*h*-1 may include a processor 910, a memory 920, a transceiver 940, antennas 950, a P2P GO controller 605-*a*, and an absence period indication generator 630-*a*. The P2P GO controller 605-*a* and the absence period indication generator 630-*a* may be an example of aspects of the respective components in the P2P GO device shown in FIG. 6. Each of these components may be in communication with each other, directly or indirectly, over at least one bus 905.

The memory 920 may include RAM or ROM. The memory 920 may store computer-readable, computer-executable software (SW) code 925 containing instructions that are configured to, when executed, cause the processor 910 to perform various functions described herein. Alternatively, the software code 925 may not be directly executable by the processor 910 but be configured to cause the device (e.g., when compiled and executed) to perform functions described herein.

The processor 910 may include an intelligent hardware device, e.g., a CPU, a microcontroller, an ASIC, etc. The processor 910 may process information received through the transceiver 940 or to be sent to the transceiver 940 for transmission through the antennas 950. The processor 910 may handle, alone or in connection with other components of the P2P GO device 110-*h*-1 various operations described herein.

The transceiver 940 may be configured to communicate bi-directionally with a conventional AP 105-*b*, a P2P client device 110-*h*-2, and a legacy client device 110-*h*-3, which may be examples of the respective APs 105, 105-*a*, P2P client devices 110-*a*-2, 110-*b*-2, 110-*c*-2, 110-*f*, and legacy client devices 110-*a*-3, 110-*b*-3, 110-*c*-3, 110-*g* described above. The transceiver 940 may be implemented as at least one transmitter and at least one separate receiver in some embodiments. The transceiver 940 may include a modem configured to modulate the packets and provide the modulated packets to the antennas 950 for transmission, and to demodulate packets received from the antennas 950. While the P2P GO device 110-*h*-1 may include a single antenna in some embodiments, there may be aspects in which the P2P GO device 110-*h*-1 may alternatively include multiple antennas 950.

The components of the P2P GO device 110-*h*-1 may be configured to implement aspects discussed above with respect to FIGS. 1-8, and those aspects may not be repeated here for the sake of brevity. Moreover, the components of the P2P GO device 110-*h*-1 may be configured to implement aspects discussed below with respect to FIGS. 10-13, and those aspects may not be repeated here also for the sake of brevity.

Figure 10:
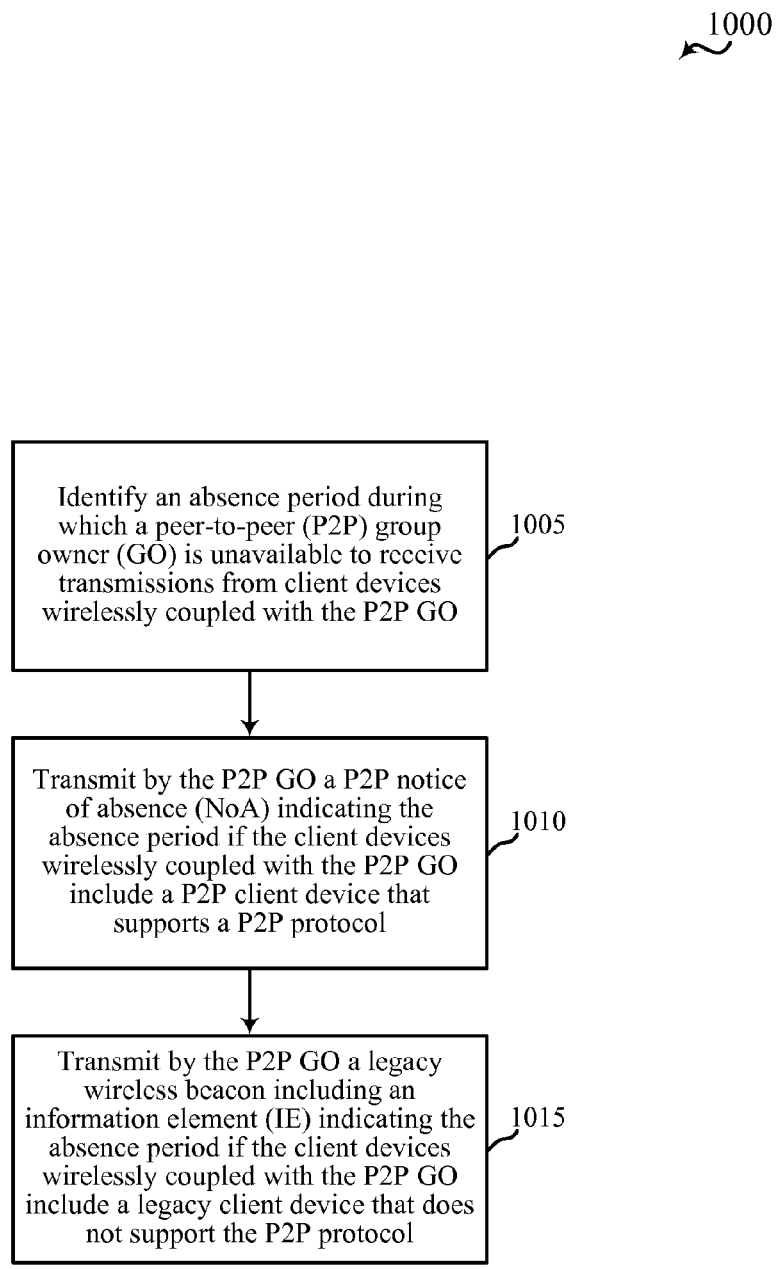
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of the P2P GO device 110-*a*-1, 110-*b*-1, 110-*c*-1, 110-*e*, 110-*h*-1 described above. In some examples, a P2P GO device may execute sets of codes to control its functional elements to perform the functions described below. Additionally or alternatively, the P2P GO device may perform the functions described below using-purpose hardware.

At block 1005, the method 1000 may include identifying an absence period during which a P2P GO is unavailable to receive transmissions from client devices wirelessly coupled with the P2P GO. The operation at block 1005 may in some embodiments be performed using the P2P GO controller 605 described above with reference to FIG. 6.

At block 1010, the method 1000 may include transmitting, by the P2P GO device, a P2P NoA indicating the absence period identified at block 1005 if the client devices wirelessly coupled with the P2P GO include at least one P2P client device that supports a P2P protocol. The operation at block 1005 may in some embodiments be performed using the P2P client device coordinator 615 in conjunction with the absence period indication generator 630 and the transmitter 515-*a*, as described above with reference to FIG. 6.

At block 1015, the method 1000 may include transmitting, by the P2P GO device, a legacy wireless beacon including an IE (such as the Mute IE described herein) indicating the absence period identified at block 1005 if the client devices wirelessly coupled with the P2P GO device include at least one legacy client device that does not support the P2P protocol. The operation at block 1015 may in some embodiments be performed using the legacy client device coordinator 620 in conjunction with the absence period indication generator 630 and the transmitter 515-*a*, as described above with reference to FIG. 6.

Thus, the method 1000 may provide for wireless communication. It is noted that the method 1000 is just one implementation and that the operations of the method 1000 may be rearranged or otherwise modified such that other implementations are possible.

Figure 11:
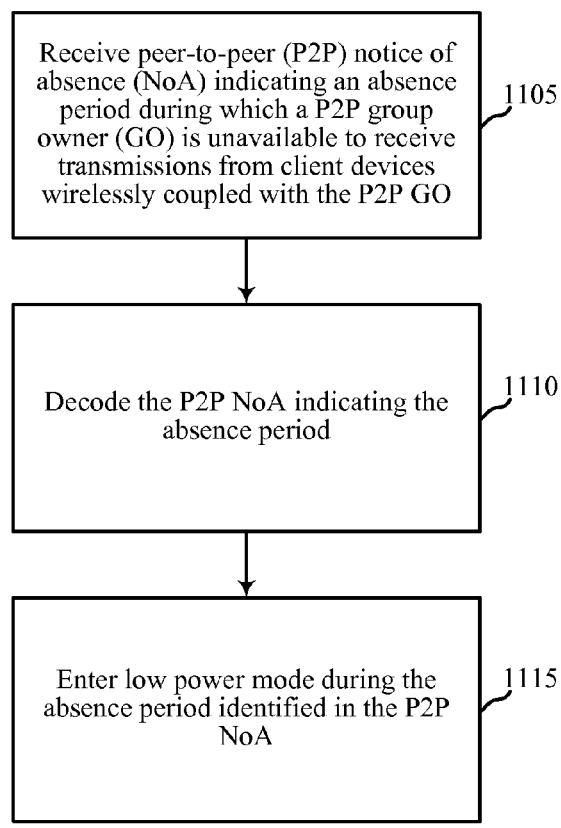
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of the P2P client devices 110-*a*-2, 110-*b*-2, 110-*c*-2, 110-*f*, 110-*h*-2 described above. In some examples, a P2P client device may execute sets of codes to control its functional elements to perform the functions described below. Additionally or alternatively, the P2P client device may perform the functions described below using-purpose hardware.

At block 1105, the method 1100 may include receiving a P2P NoA indicating an absence period during which a P2P GO with which the P2P client device is wirelessly coupled will be unavailable to receive transmissions from client devices wirelessly coupled with the P2P GO. At block 1110, the method 1100 may include decoding the P2P NoA indicating the absence period. The operations at blocks 1105 and 1110 may in some embodiments be performed using the P2P client decoder 705 described above with reference to FIG. 705.

At block 1115, the method 1100 may include entering a low power mode during the absence period identified in the P2P NoA, thus preventing the P2P client device from accessing the wireless communication channel between the P2P client device and the P2P GO during the identified absence period. The operation at block 1115 may in some embodiments be performed using the P2P client low power manager 715 described above with reference to FIG. 7.

Thus, the method 1100 may provide for wireless communication. The method 1100 is just one implementation and the operations of the method 1100 may be rearranged or otherwise modified such that other implementations are possible.

Figure 12:
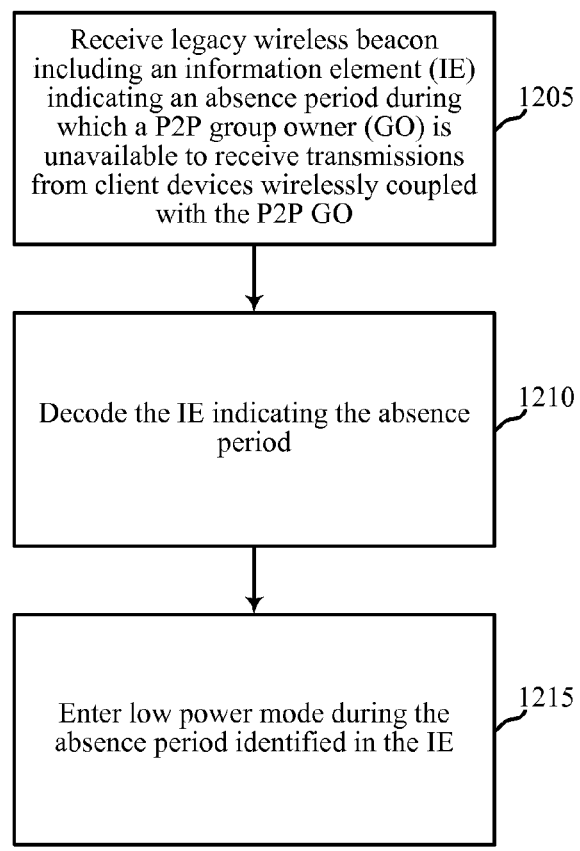
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of the legacy client devices **110-*a*-3, 110-*b*-3, 110-*c*-3, 110-*g*, 110-*h*-3** described above. In some examples, a legacy client device may execute sets of codes to control its functional elements to perform the functions described below. Additionally or alternatively, the legacy client device may perform the functions described below using-purpose hardware.

At block 1205, the method 1200 may include receiving a legacy wireless beacon including an IE (such as the Mute IE described herein) indicating an absence period during which a P2P GO with which the legacy client device is coupled will be unavailable to receive transmissions from client devices wirelessly coupled with the P2P GO. At block 1210, the method 1200 may include decoding the IE indicating the absence period. The operations at blocks 1205 and 1210 may in some embodiments be performed using the legacy WLAN client decoder 805 described above with reference to FIG. 8.

At block 1215, the method 1200 may include entering a low power mode during the absence period identified in the IE. The operation at block 1215 may in some embodiments be performed using the legacy WLAN client low power manager described above with reference to FIG. 8.

Thus, the method 1200 may provide for wireless communication. The method 1200 is just one implementation and the operations of the method 1200 may be rearranged or otherwise modified such that other implementations are possible.

Figure 13:
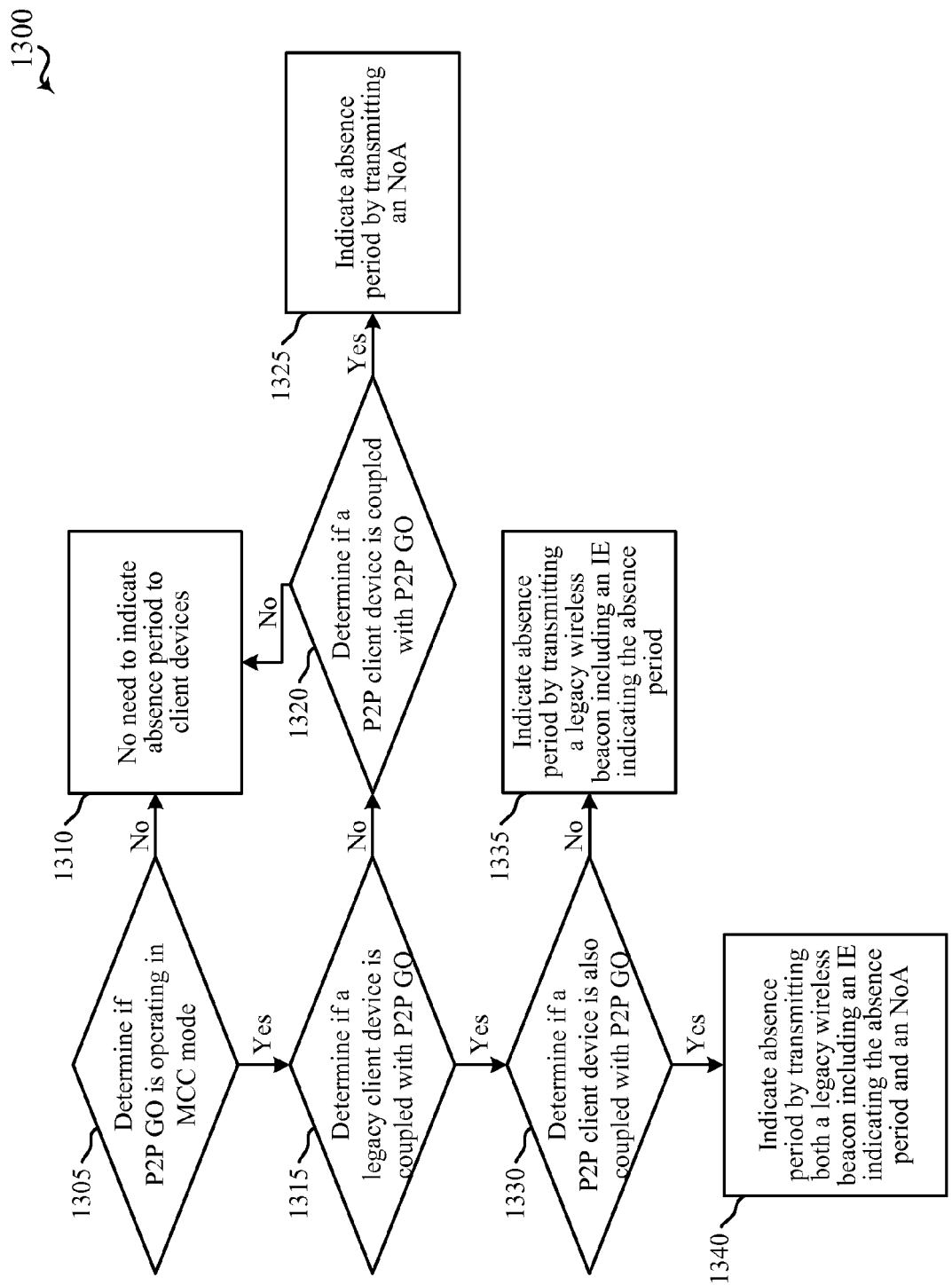
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of the P2P GO device **110-*a*-1, 110-*b*-1, 110-*c*-1, 110-*e*, 110-*h*-1** described above. In some examples, a P2P GO device may execute sets of codes to control its functional elements to perform the functions described below. Additionally or alternatively, the P2P GO device may perform the functions described below using-purpose hardware.

The method 1300 shown in FIG. 13 may be similar to the method 1000 shown in FIG. 10, but may be specific to a multi-channel concurrent (MCC) mode of operation for the P2P GO device. At block 1305 of the method 1300 shown in FIG. 13, the method 1300 may include determining if the P2P GO device is operating in a multi-channel concurrent (MCC) mode of operation. If no at block 1305, there may be no need to indicate an absence period to client devices wirelessly coupled with the P2P GO device at block 1310. If yes at block 1305, however, the method 1300 may proceed to block 1315, which may include determining if a legacy client device is wirelessly coupled with the P2P GO device. If no at block 1315, the method may proceed to block 1320, which may include determining if a P2P client device is wirelessly coupled with the P2P GO device. If no at block 1320, there may be no need to indicate an absence period to client devices at block 1310. If yes at block 1320, the method may proceed to block 1325, which may include indicating an absence period associated with the MCC mode of operation by transmitting a P2P NoA. Returning to block 1315, if yes at block 1315, the method may proceed to block 1330, which may include determining if a P2P client device is also coupled with the P2P GO device. If no at block 1330, the method may proceed to block 1335, which may include indicating the absence period associated with the MCC mode of operation by transmitting a legacy wireless beacon including an IE (such as the Mute IE described herein) indicating the absence period. If yes at block 1330, the method may proceed to block 1340, which may include indicating the absence period by transmitting both a legacy wireless beacon including an IE (such as the Mute IE) indicating the absence period and a P2P NoA. In this manner, the P2P GO device may publish information regarding upcoming absence periods via the Mute IE, the P2P NoA, or both, depending on which types of client devices are wirelessly coupled with the P2P GO device. Further, because any P2P client devices wirelessly coupled with the P2P GO may be configured to only decode the P2P NoA (and not the Mute IE), and because any legacy client devices wirelessly coupled with the P2P GO may be configured to only decode the Mute IE (and not the P2P NoA), the client devices wirelessly coupled to the P2P GO may consume less power and experience less confusion than may be the case if the client devices decoded multiple indications of the identified absence period(s).

Thus, the method 1300 may provide for wireless communication. The method 1300 is just one implementation, and the operations of the method 1300 may be rearranged or otherwise modified such that other implementations are possible.

In some examples, aspects from two or more of the methods 1000, 1100, 1200, 1300 may be combined. The methods 1000, 1100, 1200, 1300 are just illustrative implementations, and the operations of the methods 1000, 1100, 1200, 1300 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored or transmitted as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or" when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    identifying an absence period during which a peer-to-peer (P2P) group owner (GO) is unavailable to receive transmissions from client devices wirelessly coupled with the P2P GO;
    transmitting by the P2P GO a P2P notice of absence (NoA) indicating the absence period if the client devices wirelessly coupled with the P2P GO include a P2P client device that supports a P2P protocol;
    transmitting by the P2P GO a legacy wireless beacon comprising an information element (IE) indicating the absence period if the client devices wirelessly coupled with the P2P GO include a legacy client device that does not support the P2P protocol; and
    communicating by the P2P GO with an access point (AP) in a multi-channel concurrent mode of operation during the identified absence period using a first frequency band that at least partially overlaps with a second frequency band used by the client devices to communicate with the P2P GO.

2. The method of claim 1, further comprising:
    performing channel scanning by the P2P GO during the identified absence period.

3. The method of claim 1, wherein the legacy wireless beacon is undecodable by the P2P client device.

4. The method of claim 1, further comprising:
    prohibiting the client devices from accessing a wireless communication channel during the identified absence period based at least in part on the P2P NoA or the IE of the legacy wireless beacon.

5. The method of claim 1, further comprising:
    transmitting the P2P NoA in a beacon frame from the P2P GO to the client devices.

6. The method of claim 1, wherein the client devices and the P2P GO communicate using a 2.4 GHz radio band.

7. The method of claim 1, further comprising:
    transmitting the IE indicating the absence period in a probe response frame to the client devices.

8. The method of claim 1, wherein the IE indicating the absence period comprises a start time for the absence period, a duration of the absence period, and an interval between the absence period and successive absence periods.

9. The method of claim 1, further comprising:
    transmitting the legacy wireless beacon during an active period in which the P2P GO communicates with the client devices prior to the absence period.

10. The method of claim 1, further comprising:
    triggering a low power mode of the legacy client device during the absence period by transmitting the legacy wireless beacon.

11. An apparatus for wireless communication, comprising:
    a peer-to-peer (P2P) group owner (GO) controller to identify an absence period during which a P2P GO is unavailable to receive transmissions from client devices wirelessly coupled with the P2P GO;
    a P2P client device coordinator to transmit a P2P notice of absence (NoA) indicating the absence period if the client devices wirelessly coupled with the P2P GO include a P2P client device that supports a P2P protocol;
    a legacy client device coordinator to transmit a legacy wireless beacon comprising an information element (IE) indicating the absence period if the client devices wirelessly coupled with the P2P GO include a legacy client device that does not support the P2P protocol; and an access point (AP) coordinator to communicate with an AP in a multi-channel concurrent mode of operation during the identified absence period using a first frequency band that at least partially overlaps with a second frequency band used by the client devices to communicate with the P2P GO.

12. The apparatus of claim 11, wherein the legacy wireless beacon is undecodable by the P2P client device.

13. The apparatus of claim 11, wherein the P2P NoA or the IE acts to prohibit the client devices from accessing a wireless communication channel during the identified absence period.

14. The apparatus of claim 11, wherein the client devices and the P2P GO communicate using a 2.4 GHz radio band.

15. The apparatus of claim 11, wherein the legacy client device coordinator transmits the legacy wireless beacon during an active period in which the P2P GO communicates with the client devices prior to the absence period.

16. An apparatus for wireless communication, comprising:
a processor;
memory in electronic communication with the processor; and
instructions stored in the memory and operable, when executed by the processor, to cause the apparatus to:
identify an absence period during which a peer-to-peer (P2P) group owner (GO) is unavailable to receive transmissions from client devices wirelessly coupled with the P2P GO;
transmit by the P2P GO a P2P notice of absence (NoA) indicating the absence period if the client devices wirelessly coupled with the P2P GO include a P2P client device that supports a P2P protocol;
transmit by the P2P GO a legacy wireless beacon comprising an information element (IE) indicating the absence period if the client devices wirelessly coupled with the P2P GO include a legacy client device that does not support the P2P protocol; and
communicate by the P2P GO with an access point (AP) in a multi-channel concurrent mode of operation during the identified absence period using a first frequency band that at least partially overlaps with a second frequency band used by the client devices to communicate with the P2P GO.

17. The apparatus of claim 16, wherein the legacy wireless beacon is undecodable by the P2P client device.

18. The apparatus of claim 16, wherein the instructions are further executable by the processor to cause the apparatus to:
prohibit the client devices from accessing a wireless communication channel during the identified absence period based at least in part on the P2P NoA or the IE of the legacy wireless beacon.

19. The apparatus of claim 16, wherein the client devices and the P2P GO communicate using a 2.4 GHz radio band.

20. The apparatus of claim 16, wherein the instructions are further executable by the processor to cause the apparatus to:
transmit the legacy wireless beacon during an active period in which the P2P GO communicates with the client devices prior to the absence period.

21. A non-transitory computer-readable medium for wireless communication in a wireless device, the non-transitory computer-readable medium storing computer-executable code for:
identifying an absence period during which a peer-to-peer (P2P) group owner (GO) is unavailable to receive transmissions from client devices wirelessly coupled with the P2P GO;
transmitting by the P2P GO a P2P notice of absence (NoA) indicating the absence period if the client devices wirelessly coupled with the P2P GO include a P2P client device that supports a P2P protocol;
transmitting by the P2P GO a legacy wireless beacon comprising an information element (IE) indicating the absence period if the client devices wirelessly coupled with the P2P GO include a legacy client device that does not support the P2P protocol; and
communicating by the P2P GO with an access point (AP) in a multi-channel concurrent mode of operation during the identified absence period using a first frequency band that at least partially overlaps with a second frequency band used by the client devices to communicate with the P2P GO.

22. The computer-readable medium of claim 21, wherein the legacy wireless beacon is undecodable by the P2P client device.

23. The computer-readable medium of claim 21, wherein the computer-readable medium further stores computer-executable code for:
prohibiting the client devices from accessing a wireless communication channel during the identified absence period based at least in part on the P2P NoA or the IE of the legacy wireless beacon.

24. The computer-readable medium of claim 21, wherein the client devices and the P2P GO communicate using a 2.4 GHz radio band.

25. The computer-readable medium of claim 21, wherein the computer-readable medium further stores computer-executable code for:
transmitting the legacy wireless beacon during an active period in which the P2P GO communicates with the client devices prior to the absence period.

* * * * *